United States Patent
Suzuki et al.

(10) Patent No.: US 9,154,064 B2
(45) Date of Patent: Oct. 6, 2015

(54) CONTROL DEVICE FOR AC MOTOR

(71) Applicant: DENSO CORPORATION, Kariya, Aichi-pref. (JP)

(72) Inventors: Takashi Suzuki, Anjo (JP); Hirofumi Kako, Chita-gun (JP); Takeshi Itoh, Nagoya (JP)

(73) Assignee: DENSO CORPORATION, Kariya (JP)

( * ) Notice: Subject to any disclaimer, the term of this patent is extended or adjusted under 35 U.S.C. 154(b) by 89 days.

(21) Appl. No.: 14/039,255

(22) Filed: Sep. 27, 2013

(65) Prior Publication Data

US 2014/0091743 A1   Apr. 3, 2014

(30) Foreign Application Priority Data

Sep. 28, 2012   (JP) .................................. 2012-217104

(51) Int. Cl.
| | |
|---|---|
| H02H 7/09 | (2006.01) |
| H02P 6/12 | (2006.01) |
| H02P 29/02 | (2006.01) |
| H02P 21/00 | (2006.01) |
| H02P 21/14 | (2006.01) |

(52) U.S. Cl.
CPC .............. *H02P 6/12* (2013.01); *H02P 21/0035* (2013.01); *H02P 21/14* (2013.01); *H02P 29/027* (2013.01)

(58) Field of Classification Search
CPC .............. H02P 21/00; H02H 7/00; H02H 9/00
USPC .......... 318/400.02, 798, 801, 400.01, 400.21, 318/700
See application file for complete search history.

(56) References Cited

U.S. PATENT DOCUMENTS

| | | | |
|---|---|---|---|
| 6,229,719 B1 | 5/2001 | Sakai et al. | |
| 2001/0006335 A1* | 7/2001 | Kondou et al. | ................ 318/727 |
| 2002/0097015 A1* | 7/2002 | Kitajima et al. | ............... 318/432 |
| 2008/0079385 A1 | 4/2008 | Hashimoto et al. | |
| 2010/0259207 A1* | 10/2010 | Kitanaka | ................... 318/400.17 |
| 2010/0320948 A1* | 12/2010 | Royak et al. | ............. 318/400.13 |
| 2011/0080126 A1* | 4/2011 | Yabuguchi et al. | ....... 318/400.21 |
| 2011/0187304 A1* | 8/2011 | Anwar et al. | .................. 318/490 |

(Continued)

FOREIGN PATENT DOCUMENTS

| | | |
|---|---|---|
| JP | H06-253585 | 9/1994 |
| JP | 2004-159398 | 6/2004 |

OTHER PUBLICATIONS

Suzuki, et al., U.S. Appl. No. 14/039,248, filed Sep. 27, 2013.

(Continued)

*Primary Examiner* — Kawing Chan
(74) *Attorney, Agent, or Firm* — Nixon & Vanderhye PC

(57) ABSTRACT

A control device for a three-phase AC motor includes: an inverter having switching elements; current sensors for sensing a current in the motor; and a control means having a feedback control operation part for operating a voltage command of each phase and switching the switching elements based on the voltage command. When a positive and negative offset abnormality occurs, the control means executes a positive and negative offset abnormality detection process that the control means compares a value, which is obtained by integrating a variation in a voltage command of each phase over a predetermined detection interval, with a predetermined abnormality threshold value, the voltage command being outputted by the feedback control operation part with respect to a variation in the current caused by the positive and negative offset abnormality.

10 Claims, 22 Drawing Sheets

(56) References Cited

U.S. PATENT DOCUMENTS

| | | | |
|---|---|---|---|
| 2011/0187308 A1* | 8/2011 | Suhama et al. | 318/798 |
| 2011/0266992 A1* | 11/2011 | Nishiguchi et al. | 318/807 |
| 2012/0068641 A1* | 3/2012 | Imura | 318/400.02 |
| 2012/0074885 A1* | 3/2012 | Hirono | 318/400.22 |
| 2012/0098503 A1* | 4/2012 | Horihata et al. | 322/23 |
| 2012/0176069 A1* | 7/2012 | Sagami et al. | 318/400.02 |
| 2012/0217849 A1* | 8/2012 | Aoki et al. | 310/68 D |
| 2012/0217923 A1* | 8/2012 | Wu et al. | 318/610 |
| 2014/0176027 A1* | 6/2014 | Osaki et al. | 318/400.2 |
| 2015/0160625 A1* | 6/2015 | Yoshida et al. | 318/561 |

OTHER PUBLICATIONS

Suzuki, et al., U.S. Appl. No. 14/039,262, filed Sep. 27, 2013.
Suzuki, et al., U.S. Appl. No. 14/039,273, filed Sep. 27, 2013.

* cited by examiner

CONTROL DEVICE FOR AC MOTOR

CROSS-REFERENCE TO RELATED APPLICATION

This application is based on Japanese Patent Application No. 2012-217104 filed on Sep. 28, 2012, the disclosure of which is incorporated herein by reference.

TECHNICAL FIELD

The present disclosure relates to a control device for an AC motor that includes a current sensor for sensing a phase current and that controls current to be passed through an AC motor on the basis of a sensed current value.

BACKGROUND

In recent years, from the social requirement of lower fuel consumption and less exhaust emission, an electric automobile and a hybrid automobile, each of which is mounted with an AC (alternate current) motor as a power source of a vehicle, is drawing attention. For example, in some of the hybrid automobiles, a DC power source made of a secondary battery or the like and an AC motor are connected to each other via an electric power conversion device constructed of an inverter and the like, and the DC voltage of the DC power source is converted into AC voltage by the inverter to thereby drive the AC motor.

In the control device of the AC motor mounted in the hybrid automobile or the electric automobile like this, there is known a control device of performing a feedback control on the basis of current sensed values of three phases, which are sensed by the current sensors. For example, a d-axis current and a q-axis current acquired by dq transforming the current sensed values of three phases are fed back to current commands.

Here, there is known the following technique (for example, patent document 1): one current sensor is provided for each phase of a three-phase AC motor; according to the Kirchhoff's law, the sum of currents of three phases to be supplied to the AC motor becomes zero; so that in the case where the sum of current sensed values of three phases does not become zero, it is determined that any one of current sensors is abnormal.

A technique for determining whether or not any one of current sensors is abnormal by monitoring the sum of sensed values of three phases will be described with reference to FIGS. 3A and 3B.

At the time of a normal control shown in FIG. 3A, the sum of a U-phase current iu, a V-phase current iv, and a W-phase current iw is always zero, as shown by an equation (1) based on the Kirchhoff's law.

$$iu+iv+iw=0 \quad (1)$$

Here, for example, as shown in FIG. 3B, it is assumed that an abnormality is caused in which a U-phase current becomes Ius offset with respect to iu on a plus side (positive side) by an error $\Delta is$ and in which a V-phase current becomes Ivs offset with respect to iv by an error $\Delta is$, which is of the same amount as the error of the U phase, on a minus side (negative side). At this time, the sum of the current sensed values of three phases becomes 0 as shown by an equation (2), so that it is determined that current sensors are apparently normal.

$$\begin{aligned} iu + ivs + iw &= (iu + \Delta is) + (iv - \Delta is) + iw \quad (2)\\ &= iu + ivs + iw + (+\Delta is - \Delta is)\\ &= 0 \end{aligned}$$

Here, a similar situation can be brought about not only in the case where the sum of the current sensed values of three phases becomes zero but also in the case where the sum of the current sensed values of three phases is made "a value not larger than an abnormality threshold value" by the plus and minus (positive and negative) errors cancelling each other out. Hereinafter, this abnormality is referred to as "a plus/minus offset abnormality".

Hence, in the case where a feedback control is performed by an operation in which an offset error is estimated on the premise of the Kirchhoff's Law, the offset error is never found during the feedback control. Furthermore, even in an open control in which the feedback control is not performed, the errors of two phases cancel each other out to thereby reduce a deviation from a normal value, which hence makes it difficult to detect a plus/minus (positive and negative) offset abnormality.

As a result, when the control of passing current through the AC motor is continuously performed without being aware of the occurrence of a plus/minus offset abnormality, an abnormal current is likely to be passed through the inverter and the windings of the AC motor, thereby being likely to fail the circuit and the elements or to make the AC motor output an abnormal torque. For example, in the case where an AC motor is mounted in an electric vehicle such as a hybrid automobile, torque variations, power variations, and vibrations of the vehicle are caused, which hence results in causing a reduction in drivability.

Furthermore, in the case where offset errors $\Delta is$ of the U phase and the V phase are caused on the side of the same sign as shown in FIG. 4A, the magnitude of a resultant offset error $\Delta is^{++}$ is not changed from an offset error $\Delta is$ of only one phase. In contrast to this, in the case where offset errors $\Delta is$ of the U phase and the V phase are caused on the plus side and on the minus side as shown in FIG. 4B, the magnitude of the resultant offset error $\Delta is^{+-}$ becomes $\sqrt{3}$ times the offset error $\Delta is$ of only one phase.

In short, the plus/minus offset abnormality of two phases produces a larger effect on a system using an AC motor when compared with an offset abnormality of one phase in which an error is of same magnitude or an offset abnormality of the same sign of two phases in which an error is of same magnitude. Regardless of this, there is presented an problem that even if the sum of the current sensed values of three phases is monitored, a plus/minus offset abnormality cannot be detected.

[Patent document 1] Japanese Unexamined Patent Application Publication No. H06-253585

SUMMARY

It is an object of the present disclosure to provide a control device of an AC motor that can detect a positive and negative offset abnormality of current sensors of two phases.

According to an aspect of the present disclosure, a control device for a three-phase alternate current motor includes: an inverter having a plurality of switching elements for driving the alternate current motor; a plurality of current sensors, each of which senses a current passing through a respective phase of three phases of the alternate current motor; and a control means that has a feedback control operation part for operating a voltage command of each phase so as to converge a deviation between a current sensed value sensed by a respective current sensor and a current command value of a respective phase to be zero and that switches on and off each switching element based on the voltage command of each phase so as to control the current passing through the alternate current motor. When a positive and negative offset abnormality, in which one of the current sensed values of three phases causes a positive offset error and another one of the current sensed values of three phases a negative offset error, occurs, the control means executes a positive and negative offset abnormality detection process for detecting positive and negative offset abnormality in such a manner that the control means compares a value, which is obtained by integrating a variation in a voltage command of each phase over a predetermined detection interval, with a predetermined abnormality threshold value, the voltage command being outputted by the feedback control operation part with respect to a variation in the current passing through a respective phase caused by the positive and negative offset abnormality.

In the above control device, it is possible to detect the plus/minus offset abnormality of the current sensors that cannot be detected even by monitoring the sum of the current sensed values of three phases because an offset error on the plus side and an offset error on the minus side cancel each other out. Hence, it is possible to prevent the control of passing current through an AC motor from being continuously performed without being aware of the occurrence of the plus/minus offset abnormality.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, embodiments of a control device of an AC motor according to the present disclosure will be described on the basis of the drawings.

Firstly, a construction common to a plurality of embodiments will be described with reference to FIG. 1 and FIG. 2. An electric motor control device 10 as "a control device of an AC motor" according to this embodiment is applied to an electric motor drive system for driving a hybrid automobile.

[Construction of Control Device of AC Motor]

Figure 1:
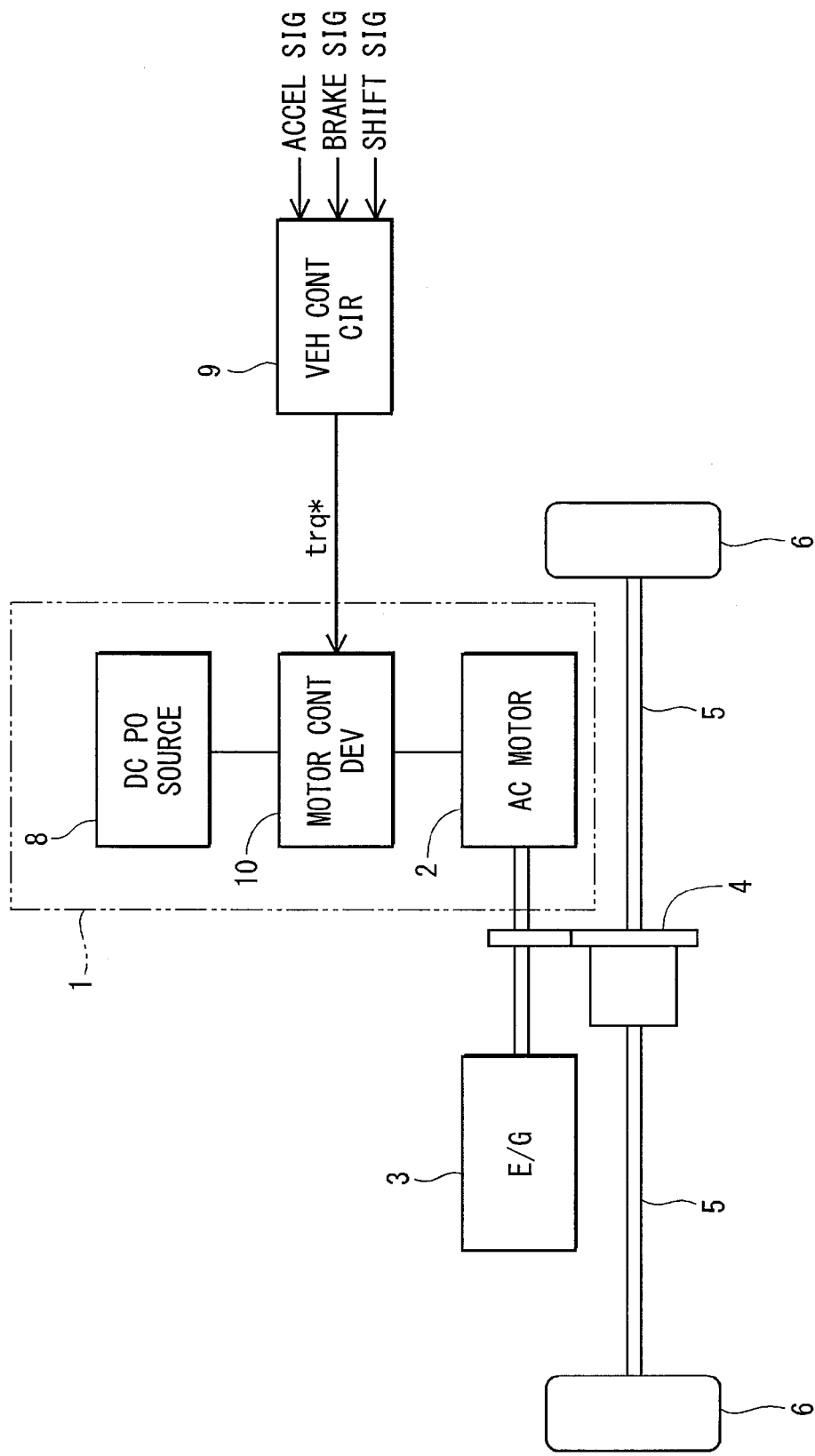
FIG. 1 is an illustration to show a construction of an electric motor drive system to which a control device of an AC motor according to each of a first embodiment to a fourth embodiment of the present disclosure is applied.

As shown in FIG. 1, an electric motor drive system 1 includes an AC motor 2, a DC power source 8, and the electric motor control device 10.

The AC motor 2 is, for example, an electric motor for generating torque for driving the driving wheels 6 of an electric vehicle. The AC motor 2 of the present embodiment is a three-phase permanent-magnet type synchronous motor.

It is assumed that the electric vehicle includes a vehicle for driving the driving wheels 6 by electric energy such as a hybrid automobile, an electric automobile, and a vehicle powered by a fuel cell. The electric vehicle of the present embodiment is a hybrid vehicle mounted with an engine 3, and the AC motor 2 is a so-called motor generator (designated by "MG" in the drawings) having a function as an electric motor that generates torque for driving the driving wheels 6 and a function as a generator that is driven by the engine 3 to thereby generate electricity.

The AC motor 2 is coupled to an axle 5 via a gear 4. In this way, the driving force of the AC motor 2 rotates the axle 5 via the gear 4 to thereby drive the driving wheels 6.

The DC power source 8 is an electric storage device that can charge and discharge, for example, a secondary cell such as a nickel metal hydride cell or a lithium ion cell, and an electric double-layer capacitor. The DC power source 8 is connected to an inverter 12 (see FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided with a CPU, a ROM, an I/O and a bass line for connecting these constructions, all of which are not shown in the drawings. The vehicle control circuit 9 controls the whole of the electric vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not shown in the drawings. The vehicle control circuit 9 detects a driving state of the vehicle on the basis of the acquired signals and outputs a torque command value trq* responsive to the driving state to the electric motor control device 10. Furthermore, the vehicle control circuit 9 outputs a command signal to an engine control circuit (not shown in the drawings) for controlling the drive of the engine 3.

Figure 2:
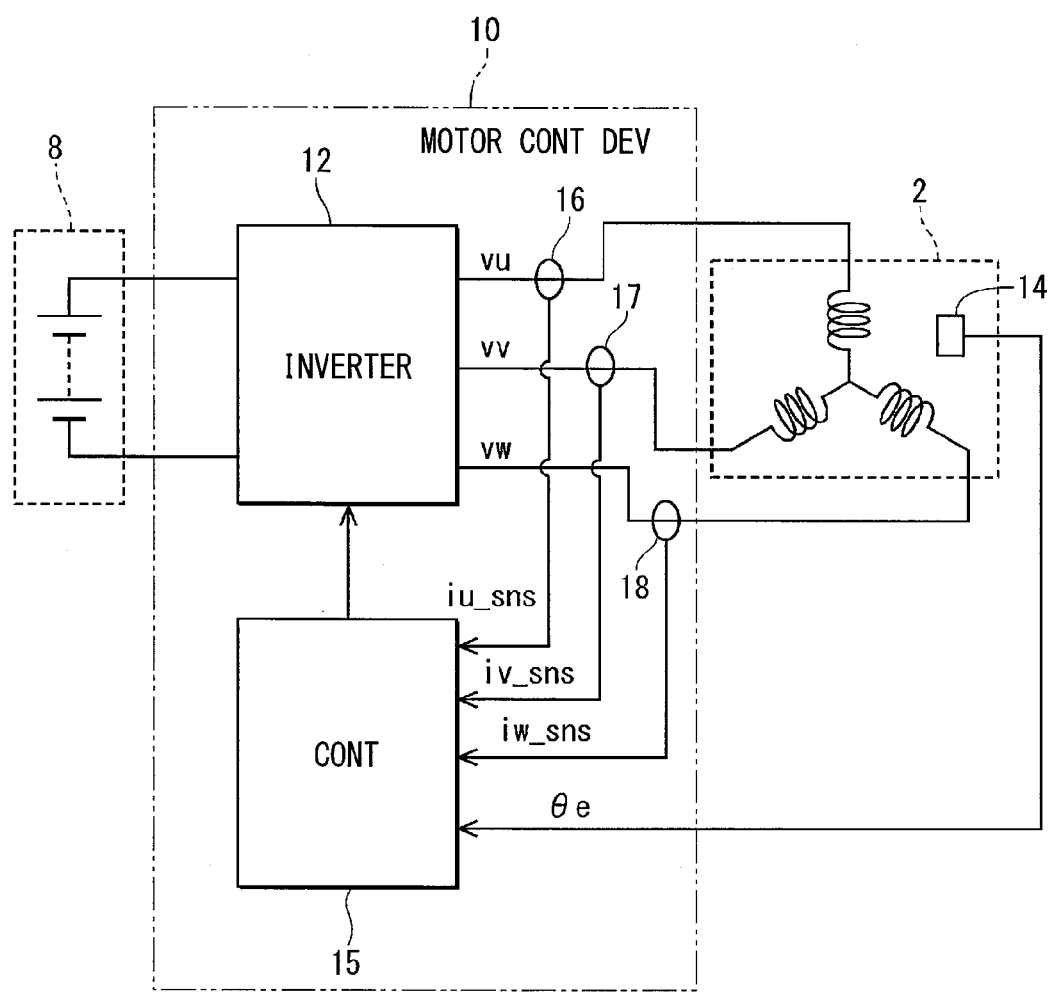
FIG. 2 is a general construction diagram of the control device of the AC motor according to each of the first embodiment to the fourth embodiment of the present disclosure.

As shown in FIG. 2, the electric motor control device 10 is provided with the inverter 12, current sensors 16, 17, 18, and a control section 15 as "a control means".

The inverter 12 has a boost voltage of DC power source inputted thereto, the boost voltage being boosted by a boost converter (not shown in the drawings). The inverter 12 has six switching elements (not shown in the drawings) connected in a bridge mode. As to the switching element, for example, an IGBT (Insulated Gate Bipolar Transistor), a MOS (Metal Oxide Semiconductor) transistor, and a bipolar transistor can be used as the switching elements.

In the case where the inverter 12 is driven by a sine wave control mode or by an over-modulation control mode, typically, the switching element is switched on/off on the basis of a PWM signal, whereby the AC motor 2 has three-phase AC voltages vu, w, vw impressed thereon and hence the drive of the AC motor 2 is controlled. Alternatively, in the case where the inverter 12 is driven by a square wave control mode, a phase is controlled by a voltage phase command.

As to the current sensors 16, 17, 18, one current sensor is provided for each of electric power lines of three phases of U phase, V phase, and W phase, which are connected to the AC motor 2 from the inverter 12, and detects each phase current. The present disclosure is made on the assumption that the current sensors are so constructed as to be "one channel for each of three phases" of this kind.

By the way, the sum of currents of three phases is always zero by Kirchhoff's law. Hence, when the current values of two phases of three phases are known, the current value of a remaining one phase can be calculated. Therefore, the calculation of dq transformation or the like in a current feedback control can be made on the basis of current sensed values of at least two phases. In this way, a phase in which control is performed on the basis of current value of the phase is referred to as "control phase".

Furthermore, by detecting a current sensed value of one phase other than the control phase, it is possible to monitor whether or not the sum of current values of three phases is zero and to determine whether or not a current sensor system is abnormal. One phase other than the control phase is referred to as "monitor phase".

In the embodiments to be described below, basically, it is assumed that control phases are a U phase and a V phase and that a monitor phase is a W phase. Here, in the other embodiments, the U phase or the V phase may be the control phase.

A rotation angle sensor 14 is provided near a rotor (not shown in the drawings) of the AC motor 2 and senses an electric angle θe and outputs the electric angle θe to the control section 15. Further, the number of revolutions rpm of the AC motor 2 is calculated on the basis of the electric angle θe sensed by the rotation angle sensor 14. The rotation angle sensor 14 of the present embodiment is a resolver but an other type of sensor such as a rotary encoder may be used in the other embodiments.

The control section 15 is constructed of a microcomputer and the like and includes a CPU, a ROM, an I/O, and a bus line for connecting these components (not shown in the drawings). The control section 15 controls the operation of the AC motor 2 by software processing that the CPU performs by executing programs previously stored or by hardware processing performed by a dedicated electronic circuit. The control section 15 will be described later in more detail in each embodiment.

According to the number of revolutions rpm of the AC motor 2, which is based on the electric angle θe sensed by the rotation angle sensor 14, and a torque command value trq* from the vehicle control circuit 9, the electric motor control device 10 drives the AC motor 2 as an electric motor to perform a powering operation, thereby consuming electricity, or drives the AC motor 2 as a generator to perform a regenerating operation, thereby generating electricity. Specifically, according to the number of revolutions rpm and to whether the command value trq* is positive or negative, the electric motor control device 10 switches the operation of the AC motor 2 into the following four patterns:

<1. Normal rotation powering operation> when the number of revolutions rpm is positive and the torque command value trq* is positive, the AC motor 2 consumes electricity;

<2. Normal rotation regenerating operation> when the number of revolutions rpm is positive and the torque command value trq* is negative, the AC motor 2 generates electricity;

<3. Reverse rotation powering operation> when the number of revolutions rpm is negative and the torque command value trq* is negative, the AC motor 2 consumes electricity; and <4. Reverse rotation regenerating operation> when the number of revolutions rpm is negative and the torque command value trq* is positive, the AC motor 2 generates electricity.

In the case where the number of revolutions rpm>0 (normal rotation) and the torque command value trq*>0, or the number of revolutions rpm<0 (reverse rotation) and the torque command value trq*<0, the inverter 12 converts the DC electricity supplied from the DC power source 8 to AC electricity by the switching operation of the switching elements to thereby drive the AC motor 2 in such a way as to output torque (perform a powering operation).

On the other hand, in the case where the number of revolutions rpm>0 (normal rotation) and the torque command value trq*<0, or the number of revolutions rpm<0 (reverse rotation) and the torque command value trq*>0, the inverter 12 converts the AC electricity generated by the AC motor 2 to DC electricity by the switching operation of the switching elements to thereby supply the DC electricity to the DC power source 8, whereby the AC motor 2 performs a regenerating operation.

[Construction and Operation/Working-Effect of Control Section]

Hereinafter, the construction and operation/working-effect of the control section 15 will be described for each of a first embodiment to a fourth embodiment. The control section of the first and third embodiments is designated by "the control section 155 (FIG. 5)" and the control section of the second and fourth embodiments is designated by "the control section 156 (FIG. 13)".

First Embodiment

The construction of the control section 155 of the first embodiment will be described with reference to FIG. 5 and FIG. 6.

A current command MAP 21 calculates a d-axis current command id* and a q-axis current command iq* in a rotating coordinate system (dq coordinate system) of the AC motor 2 on the basis of a torque command value trq* acquired from the vehicle control circuit 9. Hereinafter, "d-axis current and q-axis current" are referred to as "dq currents".

In the present embodiment, the dq current commands id*, iq* are calculated with reference to a previously stored map but may be calculated by the use of mathematical formulas or the like in the other embodiments.

A three-phase→dq transformation part 22 transforms the current sensed values iu_sns, iv_sns of the control phase to dq currents id, iq on the basis of the electric angle θe acquired from the rotation angle sensor 14.

Here, a three-phase→dq transformation based on the current sensed values of two phases will be described. First, a general equation of dq transformation will be shown by the following equation (3).

[Mathematical formula 1]

$$\begin{bmatrix} id \\ iq \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e + 120°) \end{bmatrix} \begin{bmatrix} iu \\ iv \\ iw \end{bmatrix} \quad (3)$$

From the Kirchhoff's law (see an equation (1)), the following equation (4) is acquired by substituting iw=−iu−iv into an equation (3).

[Mathemetical formula 2]

$$\begin{bmatrix} id \\ iq \end{bmatrix} = \sqrt{\frac{2}{3}} \begin{bmatrix} \cos(\theta e) - & \cos(\theta e - 120°) - \\ \cos(\theta e + 120°) & \cos(\theta e + 120°) \\ -\sin(\theta e) + & -\sin(\theta e - 120°) + \\ \sin(\theta e + 120°) & \sin(\theta e + 120°) \end{bmatrix} \begin{bmatrix} iu\_sns \\ iv\_sns \end{bmatrix}$$

$$= \sqrt{\frac{2}{3}} \times \sqrt{3} \begin{bmatrix} -\cos(\theta e + 150°) & \cos(\theta e - 90°) \\ \sin(\theta e + 150°) & -\sin(\theta e - 90°) \end{bmatrix} \begin{bmatrix} iu\_sns \\ iv\_sns \end{bmatrix}$$

$$= \sqrt{2} \begin{bmatrix} \sin(\theta e + 60°) & \sin(\theta e) \\ \cos(\theta e + 60°) & \cos(\theta e) \end{bmatrix} \begin{bmatrix} iu\_sns \\ iv\_sns \end{bmatrix} \quad (4)$$

A dq current PI control part 23 corresponds to "a feedback control operation part". The dq current PI control part 23 calculates dq voltage commands vd*, vq* by PI operation in such a way that both of the deviation between the d-axis current command id* and d-axis current id_lpf and the deviation between a q-axis current command id* and a q-axis current iq_lpf converge to zero, the d-axis current id_lpf and the q-axis current iq_lpf being currents fed back via a three phase→dq transformation part 22. The dq voltage commands vd*, vq* are inputted to a dq→three phases transformation part 24.

The dq→three phases transformation part 24 transforms the dq voltage commands vd*, vq* to three-phase voltage commands of a U-phase voltage command vu*, a V-phase voltage command vv*, and a W-phase voltage command vw* on the basis of the electric angle θe acquired from the rotation angle sensor 14. The switching elements of the inverter 12 are switched on/off by a PWM signal generated on the basis of the three-phase voltage commands vu*, vv*, vw*.

The current sensor system abnormality determination part 29 calculates the sum of current sensed values iu_sns, iv_sns, iw_sns of three phases (hereinafter referred to as "three-phase sum", as required), and when the three-phase sum is not zero, in more detail, when the three-phase sum is larger than a three-phase sum threshold value, the current sensor abnormality determination part 29 determines that a current sensor system is abnormal. Here, "the current sensor system is abnormal" means that at least one of the current sensors 16, 17, 18 of three phases is abnormal.

Figure 5:
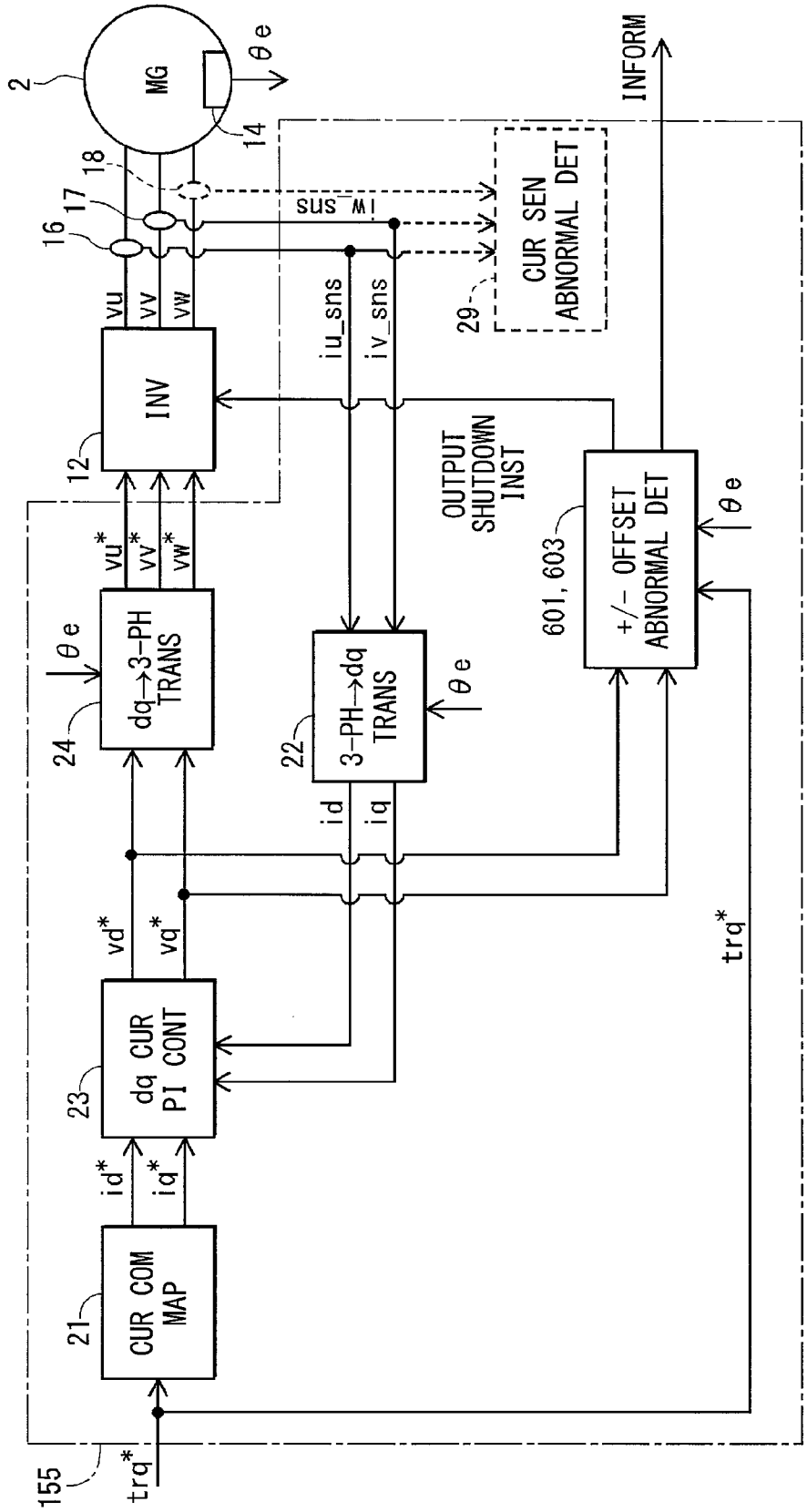
FIG. 5 is a block diagram to show a construction of a control section of a control device of an AC motor according to the first embodiment and the third embodiment of the present disclosure.

In this regard, the present embodiment is concerned with a case where an abnormality of the current sensor cannot be detected by monitoring the three-phase sum and hence shows a portion, which relates to the detection of the abnormality of the current sensor by the current sensor abnormality determination part 29, by broken lines in FIG. 5.

The construction described so far corresponds to a conventional construction of a current feedback control. This conventional construction presents the problem described above as a problem to be solved by the present disclosure. This problem will be described with reference to FIGS. 3A and 3B and FIGS. 4A and 4B.

Figure 3A:
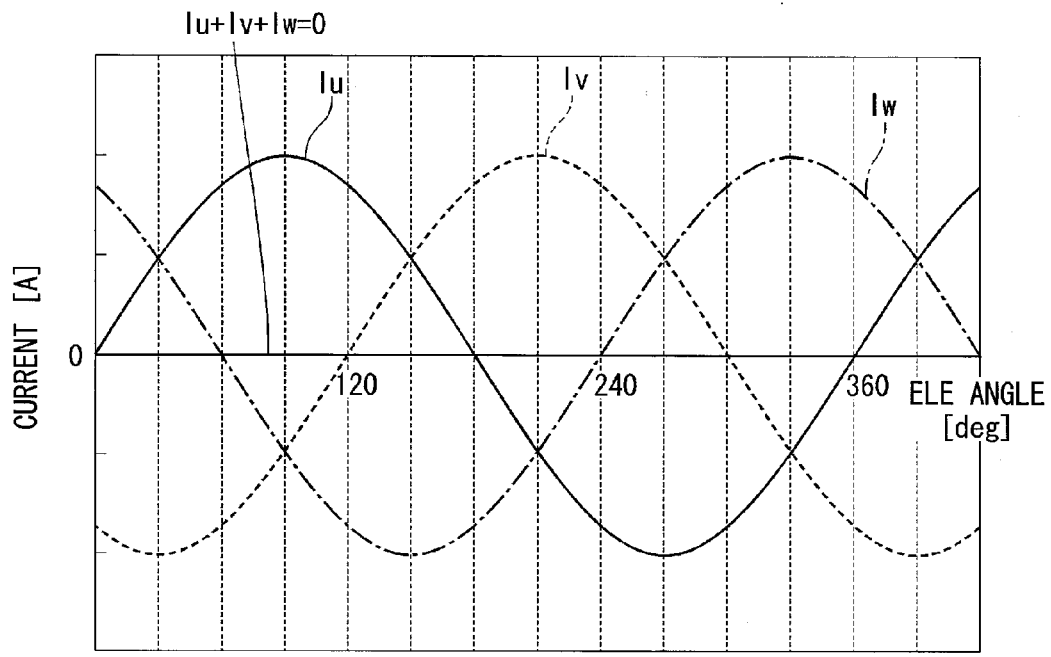
FIGS. 3A and 3B are waveform charts when current sensors of two phases are brought into a plus/minus offset abnormality.

At the time of a normal operation shown in FIG. 3A, the sum of the current sensed values of the current sensors 16, 17, 18 of three phases is expressed by the following equation (1') according to the Kirchhoff's Law.

$$iu\_sns + iv\_sns + iw\_sns = 0 \quad (1')$$

Figure 3B:
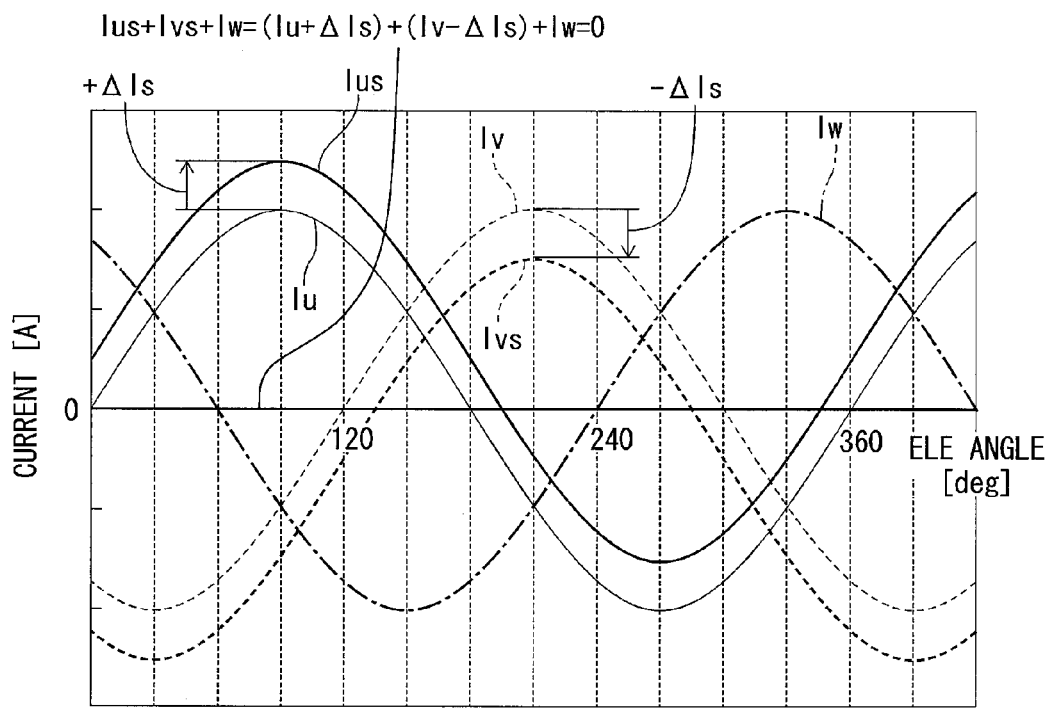

On the other hand, as shown in FIG. 3B, in the case where, for example, a plus/minus offset abnormality is caused in the U phase and the V phase, that is, in the case where an offset abnormality of an error +Δis is caused in the current sensed value iu_sns of the U phase and where an offset abnormality of an error −Δis is caused in the current sensed value iv_sns of the V phase, the sum of the current sensed values of three phases becomes zero as shown by an equation (2'). For this reason, the current sensor system is determined to be apparently normal.

$$iu\_sns + iv\_sns + iw\_sns + (+\Delta is - \Delta is) = 0 \quad (2')$$

Here, not only in the case where the three-phase sum becomes zero but also in the case where the plus error is balanced with the minus error to thereby make three-phase sum not more than the three-phase sum threshold value, the same condition is caused. For example, in the case where: the three-phase sum threshold value is 100; the error of the U phase is +120; and the error of the V phase is −30, although the error of the U phase is abnormal by itself, the errors of the two phases are balanced with each other and hence the three-phase sum becomes +90, so that the current sensor of the U phase is determined to be normal.

In this way, the plus/minus offset abnormality is determined to be apparently normal by the determination of the three-phase sum, so that in the case where a feedback control is performed by the operation in which an offset error is estimated on the premise of the Kirchhoff's Law, an offset error is never found during the feedback control. Furthermore, even in an open control in which the feedback control is not performed, the errors of two phases cancel out and hence reduce a deviation from a normal value, which hence makes it difficult to detect an offset abnormality.

As a result, when the control of passing current through the AC motor is continuously performed without being aware of the occurrence of an offset abnormality, an abnormal current is passed through the inverter 12 and the windings of the AC motor 2, whereby a circuit and an element are likely to be failed. Furthermore, the AC motor is likely to generate an abnormal torque. For example, in the case where the AC motor is mounted in an electric vehicle such as a hybrid automobile, variations in torque and power or vibrations of the vehicle are brought about, which hence results in reducing drivability.

Figure 4A:
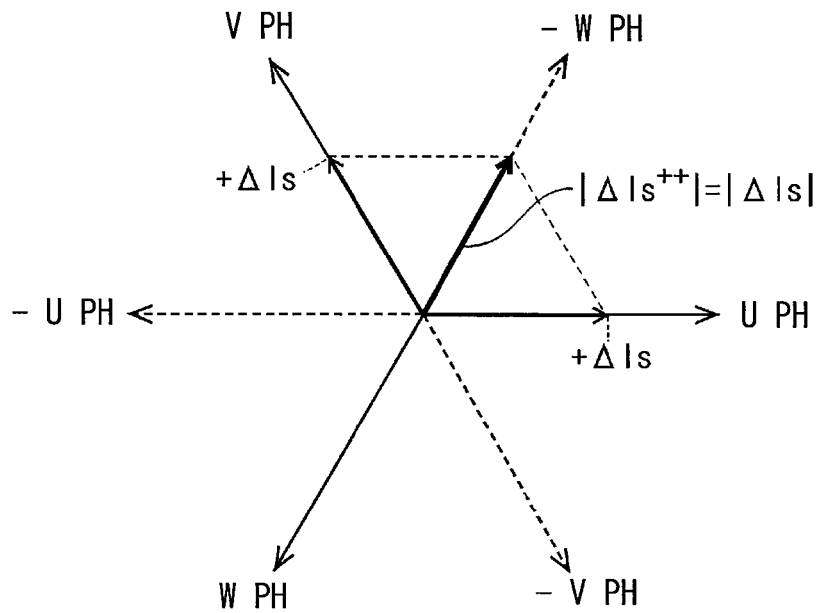
FIGS. 4A and 4B are current vector diagrams to illustrate the magnitude of a resultant offset when current sensed values by the current sensors of two phases are offset.
Figure 4B:
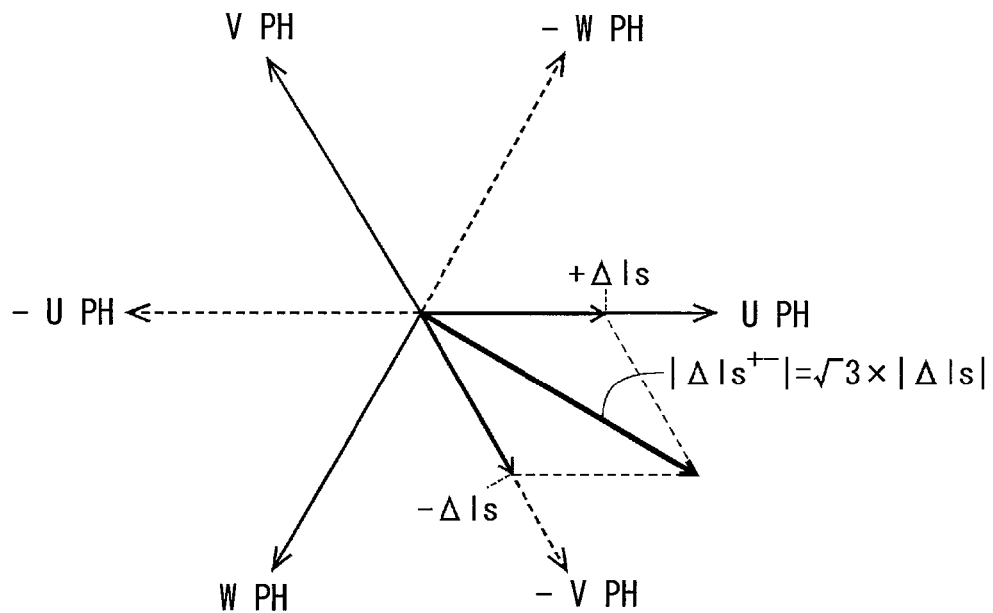

Furthermore, as described with reference to FIGS. 4A and 4B, in the plus/minus offset abnormality in two phases, the magnitude of a resultant offset error becomes $\sqrt{3}$ times an offset error of one phase or offset errors of the same sign of two phases, which hence results in producing a larger effect on the electric motor drive system 1 using the AC motor.

Thus, the control section 155 of the present embodiment includes a plus/minus offset abnormality detection part 601 so as to detect the plus/minus offset abnormality like this. As shown in FIG. 5, in the present embodiment, the dq voltage commands vd*, vq* outputted by the dq current PI control part 23 are inputted to the plus/minus offset abnormality detection part 601.

The plus/minus offset abnormality detection part 601 identifies "a current sensor system abnormality" in which the current sensors of two phases cause plus and minus offset abnormalities by "plus/minus offset abnormality detection processing", or determines that the current sensors of two phases are normal.

When the plus/minus offset abnormality is caused and the dq currents are varied, the feedback control operation will suppress the current variations, so the dq voltage commands vd*, vq* are varied. Here, the dq voltage commands vd*, vq* can be expanded in a sine wave polynomial of 1 to n order of the electric angle θe by the Fourier series expansion. Thus, by extracting components including the first order components, that is, cos(θe), sin(θe) of the electric angle θe from the dq voltage commands vd*, vq*, variations in the dq voltage commands vd*, vq* caused by the offset abnormalities can be detected.

The detailed construction of the plus/minus offset abnormality detection part 601 will be described with reference to FIG. 6.

First, the definitions of "an update point nΔ" and "an update timing" will be described. It is assumed that 1/N×360 [deg] of one period of the electric angle (where N is a natural number) is an electric angle interval Δ. Here, N is referred to as "a dividing number". For example, when the dividing number N is 24, the electric angle interval Δ corresponds to 15 [deg]. "The update point nΔ" designates an angle point of n times the electric angle interval Δ (where n is an integer from 0 to (N−1)).

In the rotation of the AC motor 2, the electric angle θe passes the update point nΔ N times from "n=0" to "n=(N−1)" in one period. For example, in the case where N=24, the electric angle θe passes the update point nΔ at the angles of 0, 15, 30, 45, . . . [deg]. Hereinafter, this is referred to as "the electric angle θe crosses the update point nΔ". When "n=N", the electric angle θe passes 360 [deg] and 1 period passes. This is referred to as "the electric angle θe crosses 0". Furthermore, the timing when the electric angle θe crosses the update point nΔ is referred to as "an update timing".

In the plus/minus offset abnormality detection processing, the timing when the electric angle θe crosses 0 is assumed to be "a starting time" and a torque command and the number of revolutions acquired at the starting time are assumed to be "starting values" (trq*0, rpm0). Thereafter, every update timing when the electric angle θe crosses the update point nΔ, the maximum values and the minimum values of the torque command trq* and the number of revolutions rpm from the starting time to that time are updated.

Furthermore, in the present embodiment, the dq voltage commands vd*, vq* are acquired at the update timing.

Hereinafter, in FIG. 6, the processing of the d-axis voltage command vd* will be described by way of example. The processing of the q-axis voltage command vq* is the same.

Figure 6:
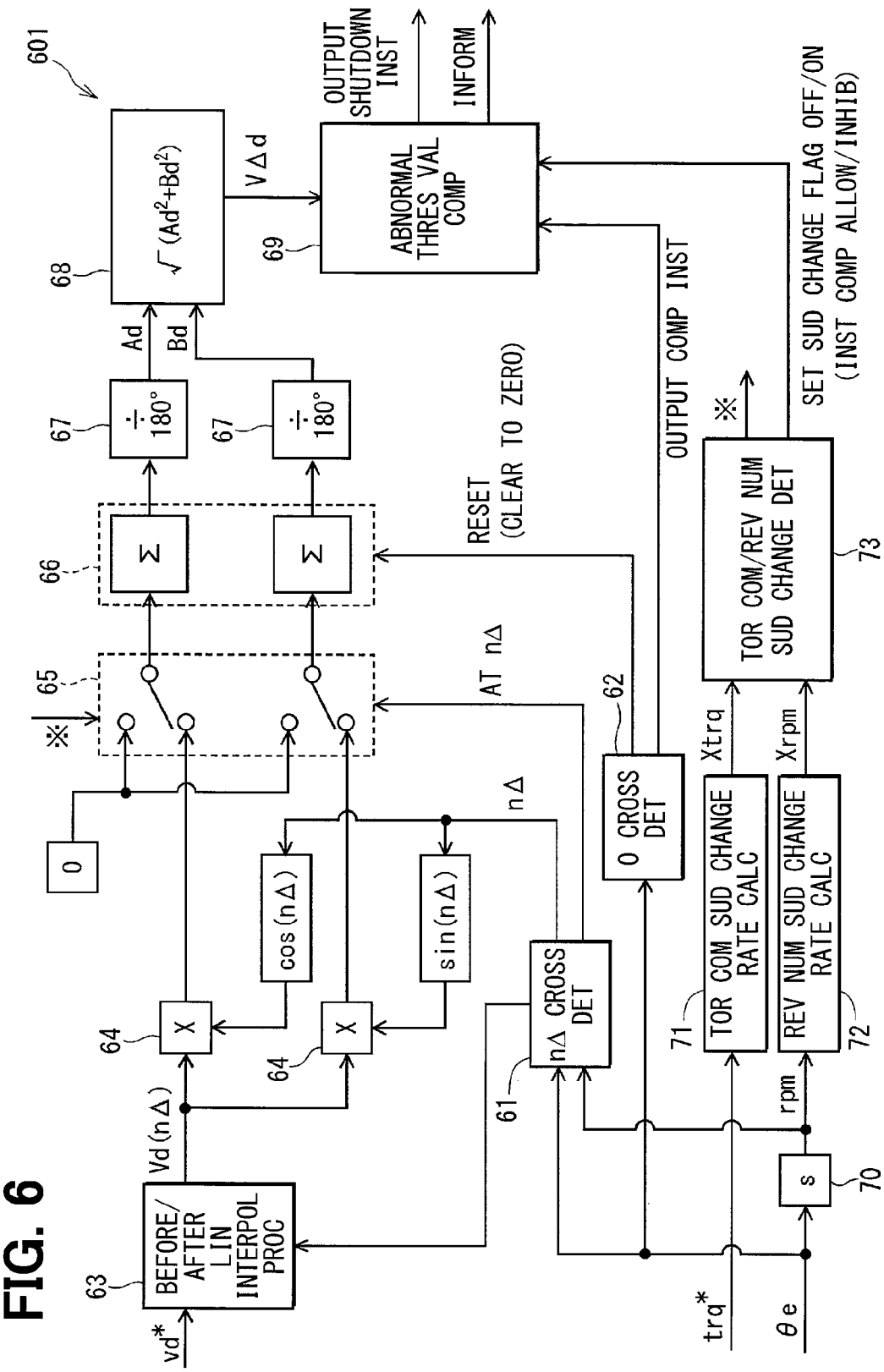
FIG. 6 is a block diagram to show a construction of a plus/minus offset abnormality detection part according to the first embodiment of the present disclosure.

In FIG. 6, when "nΔ crossing determination 61" by the electric angle θe is made, before/after linear interpolation processing 63 is instructed. In the present embodiment, the control operation period of the d-axis voltage command vd* is not synchronous with the electric angle θe, so that the d-axis voltage command vd* is not always operated exactly at the update timing. Thus, the d-axis voltage command vd* just before the update timing and the d-axis voltage command vd* just after the update timing are acquired and a d-axis voltage command interpolated value V (nΔ) at the update timing is calculated by a linear interpolation calculation.

Figure 7:
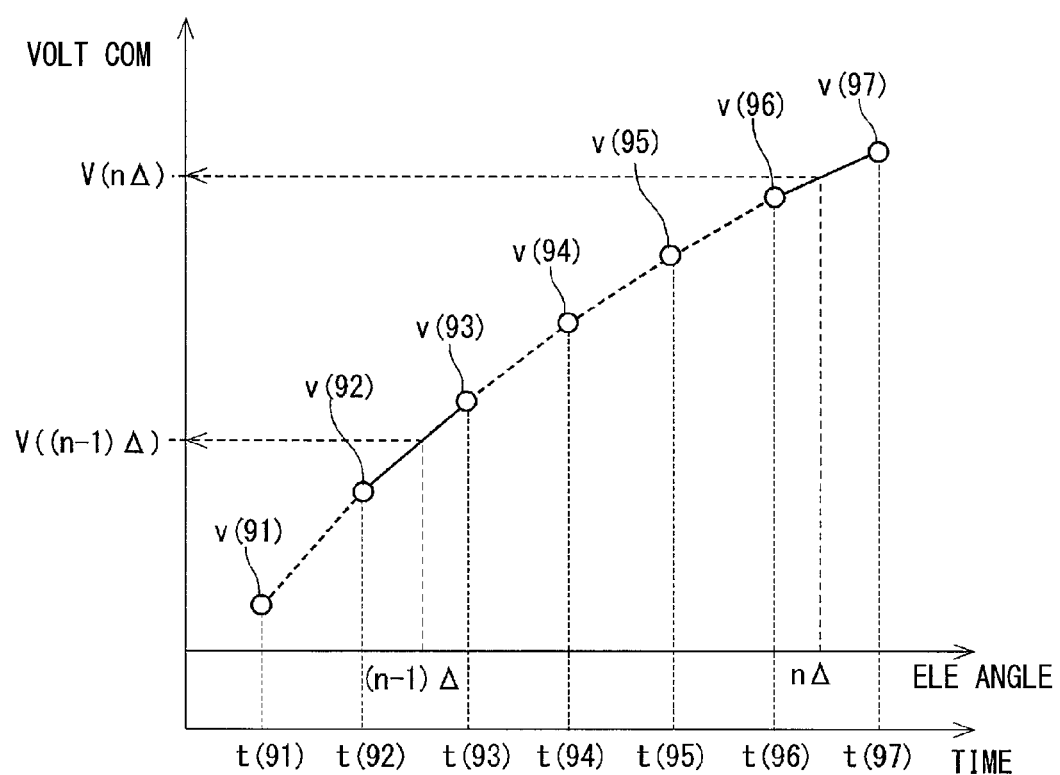
FIG. 7 is a time chart to illustrate before/after linear interpolation processing of a voltage command at an update timing.

Furthermore, the calculation of the d-axis voltage command interpolated value V (nΔ) by the before/after linear interpolation processing 63 will be described with reference to a time chart shown in FIG. 7. Here, a voltage command is generalized and is designated simply by "v". Further, when a case of the number of revolutions 1500 [rpm] of the AC motor 2 of 4 pairs of magnetic poles is assumed as a specific example, an electric frequency is 100 [Hz] and one period of the electric angle θe is 10 [ms]. When a dividing number N=24, a period per the electric angle interval Δ=15 [deg] is approximately 400 [μs]. On the other hand, when the control operation period is assumed to be 100 [μs], the update timing is set at approximately one for four periods of the control operation period.

Actually, so as to adequately balance the accuracy of the Fourier series expansion with the accuracy of integration, it is preferable that the dividing number N is set by the number of revolutions of the AC motor 2 or the electric frequency in such a way that a period per an electric angle interval Δ corresponds with approximately several periods of the control operation period. Specifically, it is recommended as follows: as the number of revolutions of the AC motor 2 or the electric frequency becomes higher, the dividing number N is made smaller, whereas as the number of revolutions of the AC motor 2 or the electric frequency becomes lower, the dividing number N is made larger.

Voltage commands v (91) to v (97) are operated at the control operation timings t (91) to t (97). On the other hand, the electric angle θe advances independently of the control operation period. Hence, a voltage command interpolated value V ((n−1) Δ) at the update timing when the electric angle θe crosses the update point (n−1) Δ is estimated by linearly interpolating a voltage command v (92) at a just-before control operation timing t (92) and a voltage command v (93) at a just-after control operation timing t (93). Furthermore, a voltage command interpolated value V (nΔ) at the update timing when the electric angle θe crosses the update point nΔ is estimated by linearly interpolating a voltage command v (96) at a just-before control operation timing t (96) and a voltage command v (97) at a just-after control operation timing t (97).

The d-axis voltage command interpolated value V (nΔ) acquired by the before/after linear interpolation processing 63 is multiplied by a cos component [cos(nΔ)] of the update point nΔ by means of a multiplier 64 and is multiplied by a sin component [sin(nΔ)] of the update point nΔ by means of a multiplier 64. The multiplied values are repeatedly integrated "until n=N−1" by means of integrators 66. When "0 crossing determination 62" by the electric angle θe is made, the integrated values by the integrators 66 are divided by means of dividers 67 and values Ad, Bd are outputted and the integrators 66 are reset (cleared to zero).

A resultant amplitude calculation part 68 calculates a square-root of sum of squares of Ad and Bd and outputs a d-axis voltage variation value V Δd. An abnormality threshold value comparison part 69 compares the d-axis voltage variation value V Δd with a d-axis voltage variation threshold value. In the case where the d-axis voltage variation value V Δd is larger than the d-axis voltage variation threshold value, the abnormality threshold value comparison part 69 determines that the current sensor system is abnormal and informs of the determination and outputs a shutdown instruction.

Furthermore, the plus/minus offset abnormality detection part 601 of the present embodiment performs sudden change determination processing. The sudden change determination processing means processing for determining that a case where a torque command trq* or the number of revolutions rpm is changed by a cause other than the abnormality of the current sensor, for example, when a vehicle accelerates suddenly or runs up a slope from on a flat road, is "a sudden change". When it is determined that the sudden change is caused, the plus/minus offset abnormality detection processing is stopped to thereby prevent an erroneous determination of the abnormality of the current sensor. The plus/minus offset abnormality detection part 601 includes a torque command sudden change rate calculation part 71, a number-of-revolutions sudden change rate calculation part 72, and a torque command/number-of-revolutions sudden change determination part 73 as a construction for this sudden change determination processing.

The torque command sudden change rate calculation part 71 acquires the torque command trq*. The number-of-revolutions sudden change rate calculation part 72 acquires the number of revolutions rpm obtained by differentiating the electric angle θe with respect to time by means of a differentiator 70.

The torque command sudden change rate calculation part 71 and the number-of-revolutions sudden change rate calculation part 72 calculate a torque command sudden change rate Xtrq and a number-of-revolutions sudden change rate Xrpm by the use of the following equations (5. 1) and (5. 2), $$Xtrq=(trq^*max-trq^*min)/trq^*0 \quad (5.1)$$

$$Xrpm=(rpmmax-rpmmin)/rpm0 \quad (5.2)$$

where "trq*0 and rpm0" designate starting values of the torque command and the number of revolutions at the starting time of one period of the electric angle. Further, "trq*max/min and rpmmax/min" designate maximum values and minimum values of the torque command and the number of revolutions after the starting time.

When the torque command sudden change rate Xtrq or the number-of-revolutions sudden change rate Xrpm becomes larger than a sudden change threshold value, the torque command/number-of-revolutions sudden change determination part 73 sets on a sudden change flag and inhibits the comparison in the abnormality threshold value comparison part 69. On the other hand, when the torque command sudden change rate Xtrq or the number-of-revolutions sudden change rate Xrpm is not larger than the sudden change threshold value, the torque command/number-of-revolutions sudden change determination part 73 sets off the sudden change flag and allows the comparison in the abnormality threshold value comparison part 69.

Furthermore, when the torque command/number-of-revolutions sudden change determination part 73 sets on the sudden change flag, the torque command/number-of-revolutions sudden change determination part 73 instructs a switching part 65 in the manner shown by *, thereby switching the switching part 65 so as to input "0".

Next, a routine of the current feedback control performed by the control section 155 will be described with reference to a flow chart shown in FIG. 8 to FIG. 12. In the description of the flow chart to be provided below, a reference character "S" means a step.

First, a first half of the whole of the current feedback control will be described with reference to FIG. 8.

The control section 155 acquires the electric angle θe from the rotation angle sensor 14 (S101) and acquires phase currents to be supplied to the AC motor 2 from the current sensors 16, 17, 18 of three phases (S102).

The current sensor abnormality determination part 29 calculates the sum of the current sensed values iu_sns, iv_sns, iw_sns of three phases (S103). At this time, it is preferable to perform filtering processing for cutting high-frequency components so as to remove noise and the like.

It is determined whether or not the absolute value of the sum of the current sensed values of three phases (hereinafter referred to as "three-phase sum") is larger than a three-phase sum threshold value (S104). If it is determined that the absolute value of the three-phase sum is not larger than the three-phase sum threshold value (S104: NO), it is determined that the current sensor system is normal and the procedure proceeds to S112.

If the absolute value of three-phase sum is larger than the three-phase sum threshold value (S104: YES), a time counter is counted up (S105). If the timer is not larger than a specified time (S106: NO), it is determined that the current sensor system is not abnormal, and the procedure proceeds to step S112.

On the other hand, if the timer is larger than the specified time (S106: YES), a notification of determination that the current sensor system is abnormal is provided and a shutdown instruction is outputted (S107), and then the procedure proceeds to step S116. Here, the meaning of "shutdown" will be described later.

If it is determined that S104 or S106 is NO, the procedure proceeds to S112, S114 according to the usual current feedback control. That is, the three phases→dq transformation part 22 calculates the dq currents id, iq by the three phases→dq transformation based on the current sensed values iu_sns, iv_sns of two control phases (U phase and V phase) (S112). Then, the dq current PI control part 23 operates the dq voltage commands vd*, vq* by the PI control operations (S114).

The first embodiment and the third embodiment are characterized in that, after S114, the procedure proceeds to the plus/minus offset abnormality detection processing (S300) focused on the variations in the dq voltage commands vd*, vq*. This plus/minus offset abnormality detection processing will be described with reference to FIG. 9 of a main flow chart and FIG. 10 to FIG. 12 of subordinate flow charts.

Figure 9:
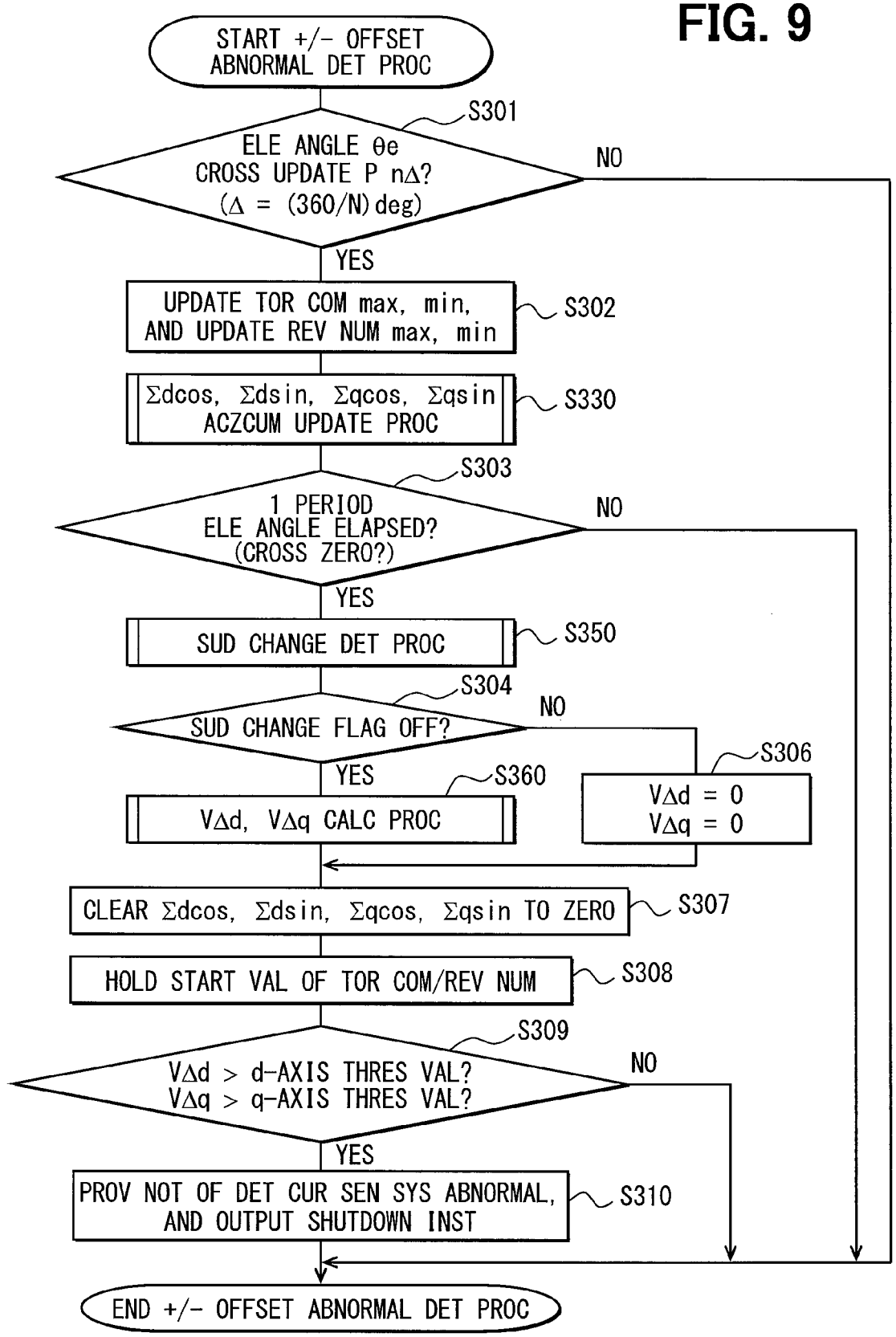
FIG. 9 is a main flow chart of plus/minus offset abnormality detection processing according to the first embodiment of the present disclosure.

It is determined in S301 shown in FIG. 9 whether or not "the electric angle θe crosses the update point nΔ". This corresponds to "nΔ crossing determination 61" shown in FIG. 6.

If it is determined that the electric angle θe crosses the update point nΔ (S301: YES), the procedure proceeds to S302. If it is determined that the electric angle θe does not cross the update point nΔ (S301: NO), the plus/minus offset abnormality detection processing is finished.

In S302, the maximum values and minimum values of the torque command (trq* max/min) and the maximum values and minimum values of the number of revolutions (rpm max/min) are updated and then the procedure proceeds to S330.

Figure 10:
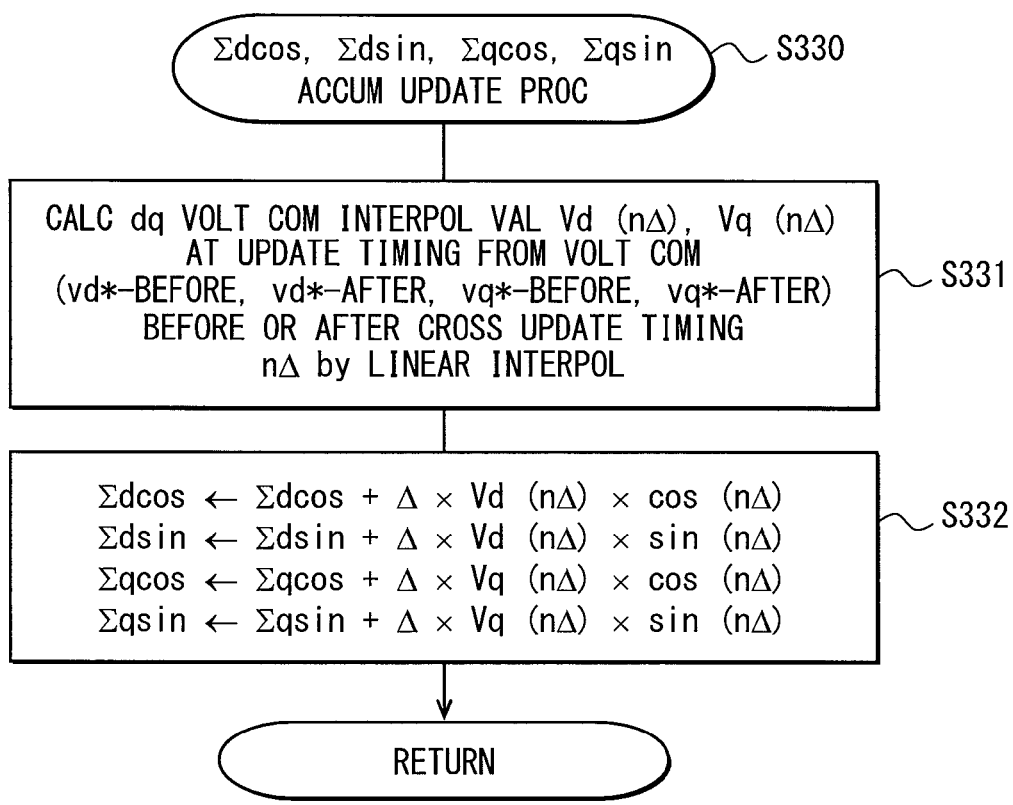
FIG. 10 is a subordinate flow chart of $\Sigma$ d cos, $\Sigma$ d sin, $\Sigma$ q cos, $\Sigma$ q sin accumulation update processing shown in FIG. 9.

"Σ d cos, Σ d sin, Σq cos, Σ q sin accumulation update processing" in S330 will be described with reference to FIG. 10.

In S331, as to the d-axis voltage command vd* and the q-axis voltage command vq*, the dq voltage command interpolated values Vd (nΔ), Vq (nΔ) at the update timing are found from the voltage commands vd*-before, vd*-after, vq*-before, vq*-after, which are values before or after crossing the update timing nΔ, by the linear interpolation, respectively.

In S332, as to the d-axis voltage command vd* and the q-axis voltage command vq*, a product of "the electric angle interval Δ", "the dq voltage command interpolated values Vd (nΔ), Vq (nΔ) at the update timing", and "cos component, sin component at the update point nΔ" is accumulated to the last value to thereby update the last value. That is, the following equations (6. 1) to (6. 4) are calculated.

$$\Sigma d \cos \leftarrow \Sigma d \cos + \Delta \times Vd(n\Delta) \times \cos(n\Delta) \quad (6.1)$$

$$\Sigma d \sin \leftarrow \Sigma d \sin + \Delta \times Vd(n\Delta) \times \sin(n\Delta) \quad (6.2)$$

$$\Sigma q \cos \leftarrow \Sigma q \cos + \Delta \times Vq(n\Delta) \times \cos(n\Delta) \quad (6.3)$$

$$\Sigma q \sin \leftarrow \Sigma q \sin + \Delta \times Vq(n\Delta) \times \sin(n\Delta) \quad (6.4)$$

In S303, it is determined whether or not the electric angle θe crosses 0 (=N Δ), that is, the electric angle passes one period. This corresponds to "0 crossing determination 62" shown in FIG. 6.

If it is determined that the electric angle θe crosses 0 (S303: YES), the procedure proceeds to S350. If it is determined that the electric angle θe does not cross 0 (S303: NO), the plus/minus offset abnormality detection processing is finished.

Figure 11:
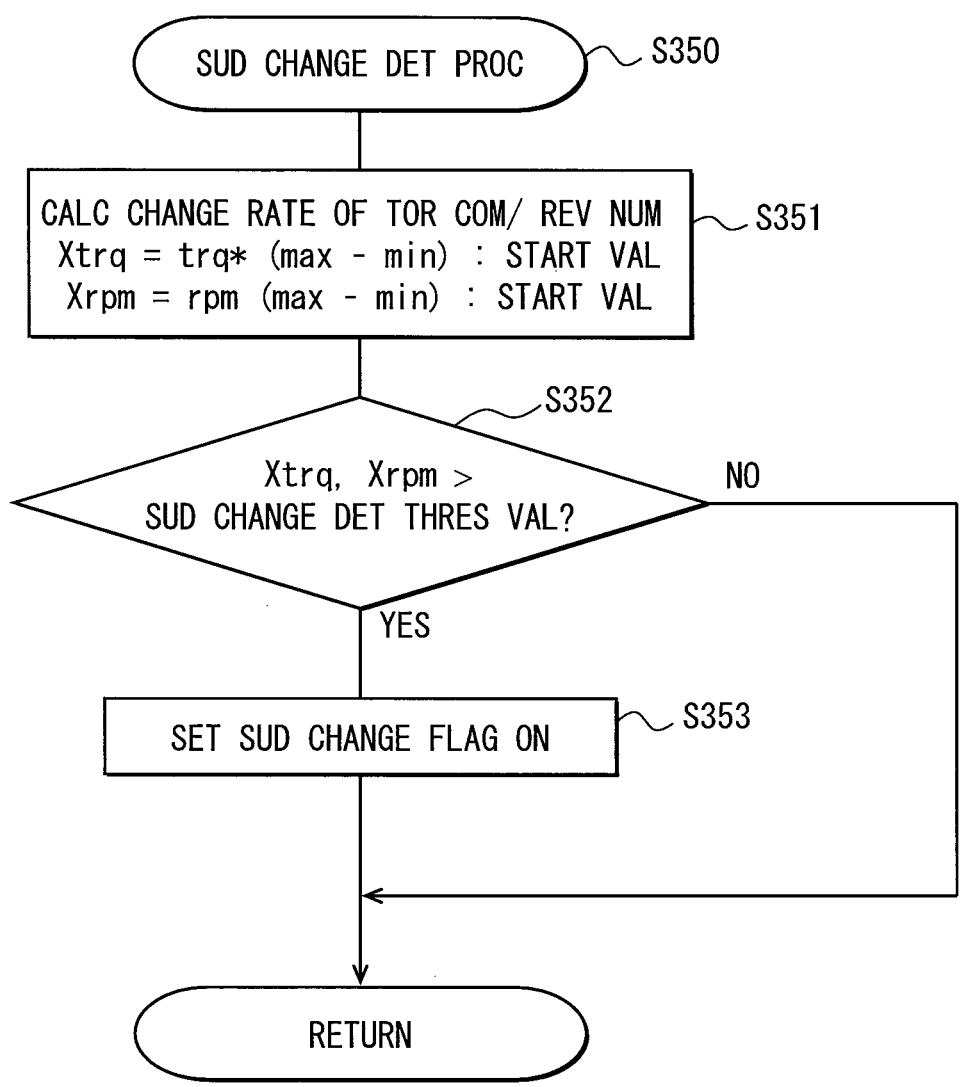
FIG. 11 is a subordinate flow chart of sudden change determination processing shown in FIG. 9.

"Sudden change determination processing" of S350 will be described with reference to FIG. 11.

In S351, the torque command sudden change rate calculation part 71 and the number-of-revolutions sudden change rate calculation part 72 calculate the torque command sudden change rate Xtrq and the number-of-revolutions sudden change rate Xrpm by the use of the following equations (5. 1) and (5. 2), respectively.

Here, as the maximum value and the minimum value of the torque command (trq*max/min) and as the maximum value and the minimum value of the number of revolutions (rpm max/min) are used the newest values updated in S302.

In S352, the torque command/number-of-revolutions sudden change determination part 73 compares the torque command sudden change rate Xtrq and the number-of-revolutions sudden change rate Xrpm with sudden change threshold values and determines whether or not the torque command sudden change rate Xtrq and the number-of-revolutions sudden change rate Xrpm correspond to "sudden change". The determination of this case may be made under OR condition, that is, when one of the torque command sudden change rate Xtrq and the number-of-revolutions sudden change rate Xrpm is larger than a sudden change threshold value of, for example, 10%, it may be determined that a sudden change is caused. Alternatively, the determination of this case may be made under AND condition, that is, when both of the torque command sudden change rate Xtrq and the number-of-revolutions sudden change rate Xrpm are larger than sudden change threshold values, respectively, it may be determined that a sudden change is caused. Furthermore, when the torque command sudden change rate Xtrq and the number-of-revolutions sudden change rate Xrpm comes into a specified region in a map, it may be determined that a sudden change is caused.

If it is determined that a sudden change is caused (S352: YES), the sudden flag is set ON (S353).

Next, in S304 shown in FIG. 9, it is determined whether or not it is determined in S350 that a sudden change is caused. If the sudden flag is OFF (S304: YES), the procedure proceeds to S360.

Figure 12:
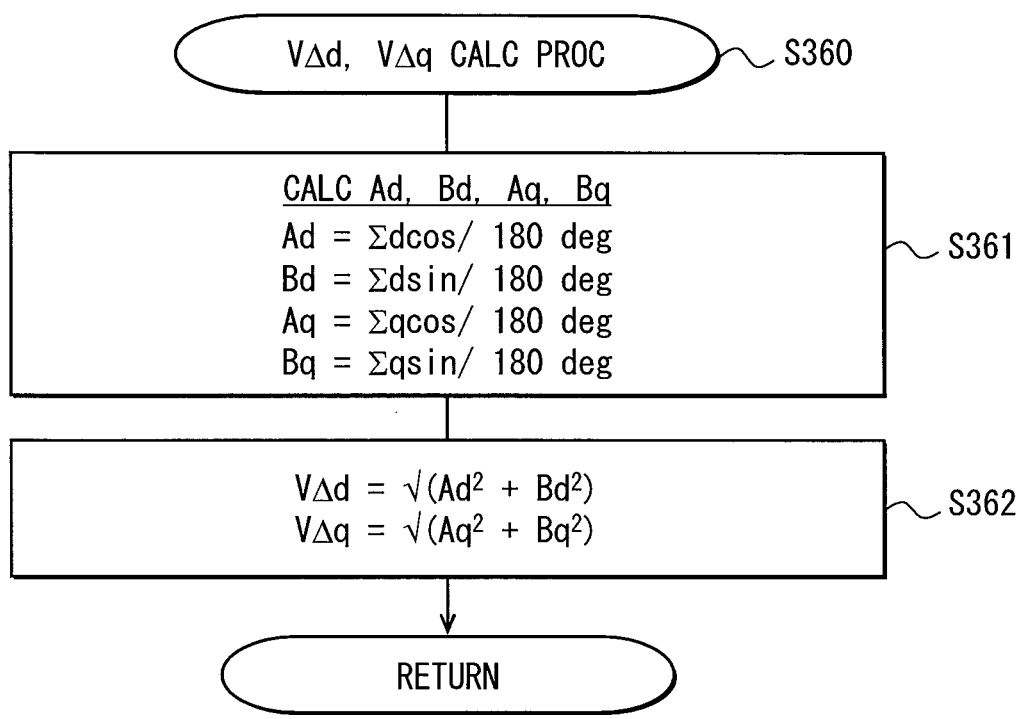
FIG. 12 is a subordinate flow chart of V$\Delta$d, V$\Delta$q calculation processing shown in FIG. 9.

"VΔd, VΔq calculation processing" of S360 will be described with reference to FIG. 12.

In S361, Σd cos, Σd sin, Σq cos, and Σq sin, which are values accumulated for one period of the electric angle, are divided respectively by 180 [deg] as shown by the following equations (7. 1) to (7. 4) to thereby calculate Ad, Bd, Aq, Bq. Here, the reason why the values accumulated are divided by 180 [deg] (=π [rad]) is based on the coefficient (1/π) in the Fourier series expand.

$$Ad = \Sigma d \cos/180 \deg \quad (7.1)$$

$$Bd = \Sigma d \sin/180 \deg \quad (7.2)$$

$$Aq = \Sigma q \cos/180 \deg \quad (7.3)$$

$$Bq = \Sigma q \sin/180 \deg \quad (7.4)$$

In S362, the resultant amplitude calculation part 68 calculates dq voltage variation values VΔd, VΔq, which are resultant amplitudes of Ad and Bd, Aq and Bq, respectively, by the use of the following equations (7. 5) and (7. 6).

$$V\Delta d = \sqrt{(Ad^2 + Bd^2)} \quad (7.5)$$

$$V\Delta q = \sqrt{(Aq^2 + Bq^2)} \quad (7.6)$$

On the other hand, in S306 to which the procedure proceeds if the sudden change flag is ON (S304: NO), the switching part 65 is switched to the "0" side and the dq voltage variation values VΔd, VΔq are zeroed. In this way, it is determined in S309 that abnormality is not caused regardless of the setting of the dq voltage variation values VΔd, VΔq, which hence results in substantially stopping the plus/minus offset abnormality detection processing in this routine.

In the subsequent S307, Σd cos, Σd sin, Σq cos, and Σq sin, which are accumulated in the integrators 66, are cleared to zero. In S308, the starting values trq*0 and rpm0 of the torque command and the number of revolutions are held.

In S309, the abnormality threshold value comparison part 69 compares the d-axis voltage variation value VΔd and the q-axis voltage variation value VΔq with a d-axis voltage variation threshold value and a q-axis voltage variation threshold value, respectively. If the d-axis voltage variation value VΔd or the q-axis voltage variation value VΔq is larger than the voltage variation threshold value (S309: YES), the abnormality threshold value comparison part 69 provides a determination that the current sensor system is abnormal and outputs a shutdown instruction (S310) and finishes the plus/minus offset abnormality detection processing.

In this regard, the electric primary d-axis voltage variation value VΔd and the electric primary q-axis voltage variation value VΔq, which are caused by the offset error, are varied with the same amplitude, so that basically both of them become larger than the voltage variation threshold value or both of them become smaller than the voltage variation threshold value. Further, the setting of the dq voltage variation threshold values will be described later.

If it is determined in S310 that the current sensor system is abnormal, since it is determined in S104, in the first place, that "the absolute value of the three-phase sum is not larger than the threshold value" (S104: NO), it is unlikely that the current sensor of only one phase is abnormal and it is highly likely that the plus/minus offset abnormality is caused in two phases.

The plus/minus offset abnormality is likely to cause the following problems: that is, an excessive current is supplied to the inverter 12 to thereby fail the circuit and the elements; or conversely a necessary current is not supplied to the inverter 12 to thereby prevent the AC motor 2 from being properly driven. In addition, as described above, the plus/minus offset abnormality produces a larger effect on the system using the AC motor 2 as compared with an offset abnormality of same magnitude of error of one phase or an offset abnormality of same sign of two phases.

For this reason, in the electric motor control device mounted particularly in the electric vehicle such as the hybrid automobile, drivability is likely to be reduced. Thus, if it is determined that the current sensor system is abnormal, from the viewpoint of fail-safe, it is adequate to provide "a shutdown instruction" of stopping the drive of the AC motor 2. When the shutdown is performed, the current is not passed through the AC motor 2 and hence the output torque is made zero. In the case of the hybrid automobile, the driver pulls over the vehicle to the shoulder of the road by inertia running and then stops the vehicle. Alternatively, the driver may instruct the vehicle control circuit 9 to switch to the running by the engine 3.

On the other hand, if it is determined in S309 that the d-axis voltage variation value VΔd and the q-axis voltage variation value VΔq are not larger than the voltage variation threshold values (S309: NO), it can be though that all of the current sensors 16, 17, 18 of three phases are normal, so that the plus/minus offset abnormality detection processing is finished without performing any processing.

With that, the description of the plus/minus offset abnormality detection processing with reference to FIG. 9 to FIG. 12 will be finished.

Figure 8:
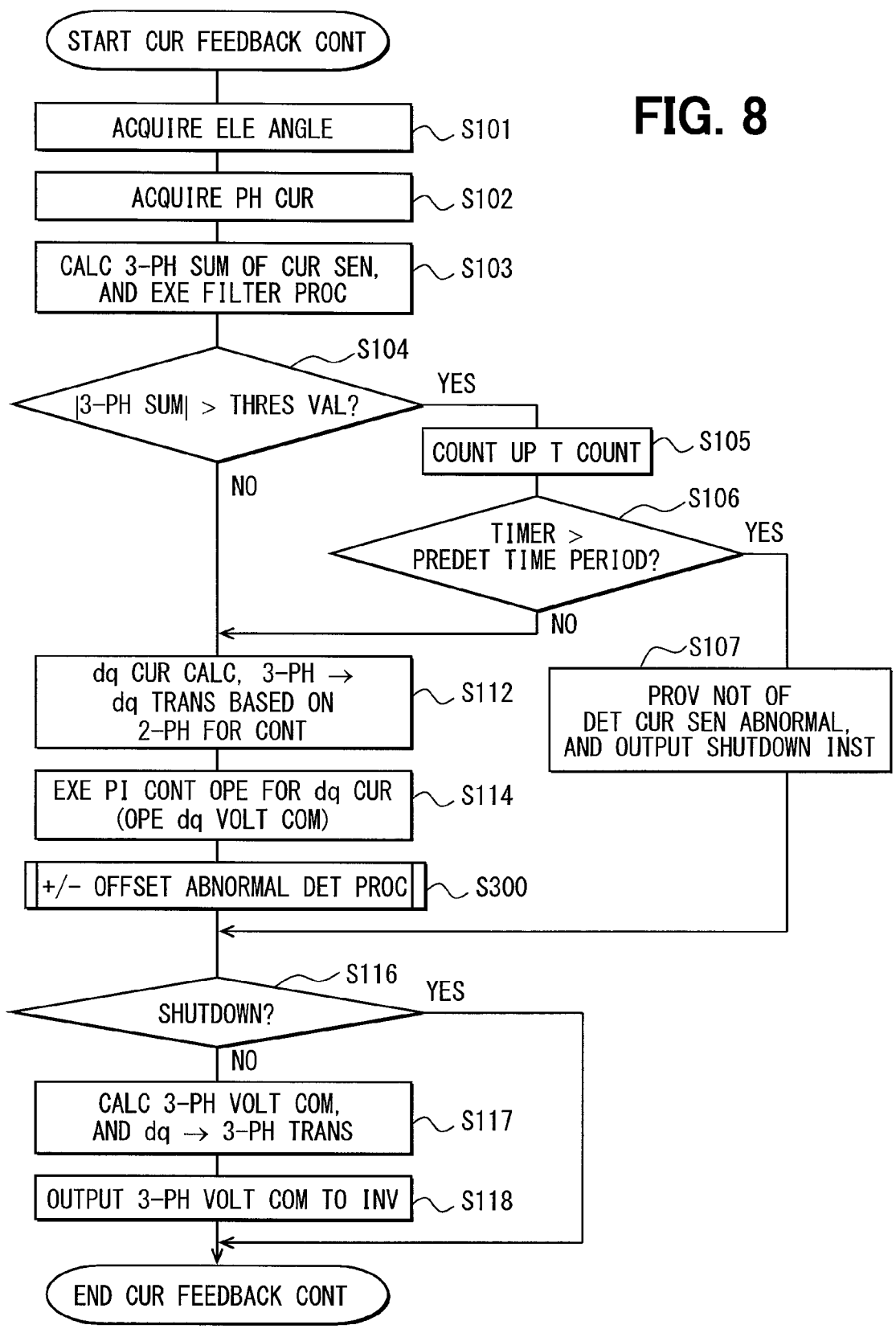
FIG. 8 is a flow chart of the whole of a current feedback control according to the first embodiment and the third embodiment of the present disclosure.

Returning to the flow chart of the whole of the current feedback control shown in FIG. 8, if the shutdown is instructed (S116: YES), the current feedback control is finished. Furthermore, if the current sensor system is normal and the shutdown is not instructed (S116: NO), the dq→three phases transformation part 24 calculates three-phase voltage commands vu*, vv*, vw* by the inverse dq transformation (S117) and outputs the three-phase voltage commands vu*, vv*, vw* to the inverter 12 (S118).

With that, the routine of the current feedback control by the control section 155 is finished.

At the end of the description of the construction of the first embodiment, the setting of the dq voltage variation threshold values will be described.

A voltage equation in the dq coordinate system is expressed by the following equations (8. 1), (8. 2) where a time-derivative term (d/dt) expressing a transient property is assumed to be zero, $$Vd = R \times Id - \omega \times Lq \times Iq \quad (8.1)$$

$$Vq = R \times Iq + \omega \times Ld \times Id + \omega \times \phi \quad (8.2)$$

where characters are defined in the following manner.
Vd, Vq: d-axis voltage, q-axis voltage
Id, Iq: d-axis current, q-axis current
R: resistance
Ld, Lq: d-axis self-inductance, q-axis self-inductance
ω: rotational angular velocity
(ω/(2π×60) corresponds to the number of revolutions per 60 sec)
φ: number of armature linkage fluxes From the equations (8. 1), (8. 2), variations in the d-axis voltage and the q-axis voltage, which are caused by variations in the d-axis current Id and the q-axis current Iq, respectively, can be expressed by the following equations (8. 3), (8. 4)

$$\Delta Vd = R \times \Delta Id - \omega \times Lq \times \Delta Iq \quad (8.3)$$

$$\Delta Vq = R \times \Delta Iq - \omega \times Ld \times \Delta Id \quad (8.4)$$

In this way, the amount of variations in voltage to the variations in current increases according to the number of revolutions. It can be thought that this holds true for the electric primary variations caused by the offset error.

In the electric primary variations caused by the offset error, it is found that the d-axis current Id and the q-axis current Iq are varied with the same amplitude. Assuming that this current amplitude is ΔI amp, since the d axis and the q axis are shifted from each other in phase by 90 [deg], the equations (8. 3), (8. 4) are translated into the equations (8. 5), (8. 6).

$$\Delta Vd = R \times \Delta Iamp \times \cos\theta - \omega \times Lq \times \Delta Iamp \times (-\sin\theta) \quad (8.5)$$

$$\Delta Vq = R \times \Delta Iamp \times (-\sin\theta) + \omega \times Lq \times \Delta Iamp \times \cos\theta \quad (8.6)$$

The amplitudes ΔVdamp, ΔVqamp of variations in the d-axis voltage, the q-axis voltage can be obtained as the amplitude of the resultant waveform of a sin component and a cos component by the following equations (8. 7), (8. 8).

$$\Delta Vdamp = \Delta Iamp \times \sqrt{\{R^2 + (\omega \times Lq)^2\}} \quad (8.7)$$

$$\Delta Vqamp = \Delta Iamp \times \sqrt{\{R^2 + (\omega \times Ld)^2\}} \quad (8.8)$$

On the basis of the equations described above, the dq voltage variation threshold values will be set in the following way.

First, the current amplitude ΔIamp by the offset error of the current sensor is calculated from the abnormality threshold value of the current sensor. Then, the dq voltage variation threshold values are set on the basis of the voltage amplitudes ΔVdamp, ΔVqamp obtained by substituting the current amplitude ΔIamp into the equations (8. 7), (8. 8). As described above, since the voltage amplitudes ΔVdamp, ΔVqamp contain a rotational angular velocity ω term, the dq voltage variation threshold values are set according to the number of revolutions.

In this regard, a method for calculating a threshold value from the theoretical formula described above contains circuit constants such as a resistance R and self-inductances Ld, Lq, and these circuit constants contain various kinds of dynamic characteristics, individual differences, and modeling errors. In order to avoid these errors, it is also recommended to cause the errors actually and to set the dq voltage variation threshold values at values to prevent a highly sensitive detection and a detection leakage.

The operation and working effect of the electric motor control device of the present embodiment will be described.

(1) The control section 155 compares the values, which are calculated on the dq voltage commands outputted by the dq current PI control part 23 for the variations in the current sensed values, with the specified abnormality threshold values, thereby detecting the plus/minus offset abnormality. In this way, it is possible to prevent the current passed through the AC motor from being continuously controlled without being aware of the occurrence of the plus/minus offset abnormality. Hence, in the case of the AC motor mounted in the electric vehicle such as the hybrid automobile, it is possible to prevent a reduction in drivability.

(2) In the case where the plus/minus offset abnormality is detected, the determination that the current sensor system is abnormal is given to the user and the shutdown instruction is given to the inverter 12 to thereby stop driving the AC motor 2. In this way, the idea of fail-safe can be realized.

(3) If the torque command sudden change rate Xtrq and the number-of-revolutions sudden change rate Xrpm are larger than the sudden change threshold values in the sudden change determination processing (S350), the sudden change flag is set ON. Further, by zeroing both of the dq voltage variation values V$\Delta$d, V$\Delta$q, the abnormality determination in the abnormality threshold value comparison part 69 is inhibited, whereby the plus/minus offset abnormality detection processing is substantially stopped.

For example, when the torque command trq* or the number of revolutions rpm is changed by a cause other than the offset abnormality of the current sensor, for example, when a vehicle accelerates suddenly or runs up a slope from on a flat road, it is likely to erroneously determine that the current sensor system is abnormal and to stop driving the AC motor 2. Thus, when it is determined that the torque command trq* or the number of revolutions rpm is suddenly changed, it is most safe to stop the processing in that routine. In this way, it is possible to prevent the erroneous determination of the plus/minus offset abnormality by a change in the request output torque or the number of revolutions by a cause other than the offset abnormality of the current sensor and to avoid stopping the drive of the AC motor by the erroneous determination.

(4) In the $\Sigma$d cos, $\Sigma$d sin, $\Sigma$q cos, $\Sigma$q sin accumulation update processing (S330), the dq voltage command interpolated values Vd (n$\Delta$), Vq (n$\Delta$) at the update timing are calculated from the voltage commands vd*-before, vd*-after, vq*-before, vq*-after, which are values before or after crossing the update timing n$\Delta$, by the linear interpolation. Further, the product of "the electric angle interval $\Delta$", "the dq voltage command interpolated values Vd (n$\Delta$), Vq (n$\Delta$) at the update timing", and "the cos component, the sin component at the update point n$\Delta$" is accumulated to the last value and is updated at one period of the electric angle $\theta$e on the basis of the dq voltage command interpolated values Vd (n$\Delta$), Vq (n$\Delta$).

In this way, in a control system in which a control operation is performed not in synchronization with the electric angle but at specified intervals, it is possible to acquire an appropriate value as a voltage command value at the update timing and to ensure "plus-minus symmetry of integration".

Next, the electric motor control device of the second to fourth embodiments of the present disclosure will be described with reference to FIG. 13 to FIG. 22. In the descriptions of the block diagrams and the flow charts of the following embodiments, the same constructions and the same steps as those in the first embodiment will be denoted by the same reference symbols and the same step numbers and their descriptions will be omitted. Different points from the first embodiment will be described in detail.

Second Embodiment

An electric motor control device of a second embodiment of the present disclosure will be described mainly with reference to FIG. 13 to FIG. 16. In the second embodiment is performed the plus/minus offset abnormality detection processing based on three-phase voltage commands in place of the dq voltage commands of the first embodiment. Further, just like the first embodiment, the sudden change determination processing is performed for the torque command trq* or the number of revolutions rpm and if it is determined that a sudden change is caused, the plus/minus offset abnormality detection processing is stopped.

Figure 13:
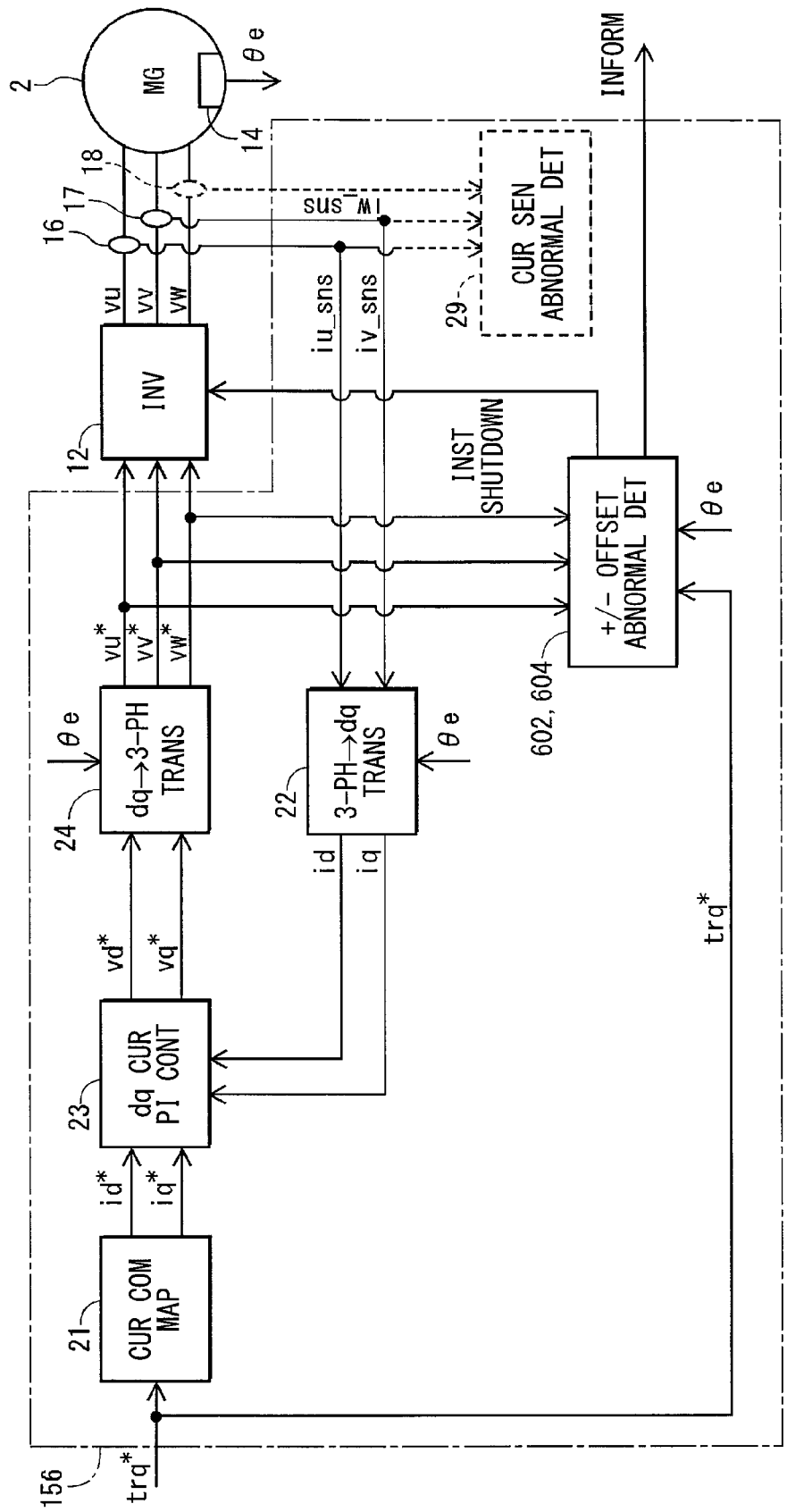
FIG. 13 is a block diagram to show a construction of a control section of a control device of an AC motor according to the second embodiment and the fourth embodiment of the present disclosure.

As shown in FIG. 13, a control section 156 of the electric motor control device of the second embodiment is different from the control section 155 (FIG. 5) of the first embodiment in that the three-phase voltage commands vu*, w*, vw* after the inverse dq transformation of the dq voltage commands vd*, vq* by the dq$\rightarrow$three phases transformation part 24 are inputted to a plus/minus offset abnormality detection part 602.

The construction of the plus/minus offset abnormality detection part 602 will be described with reference to FIG. 14. Although the processing of the U phase voltage command vu* is illustrated by way of example in FIG. 14, the pieces of processing of the V phase voltage command vv* and the W phase voltage command vw* are the same.

Figure 14:
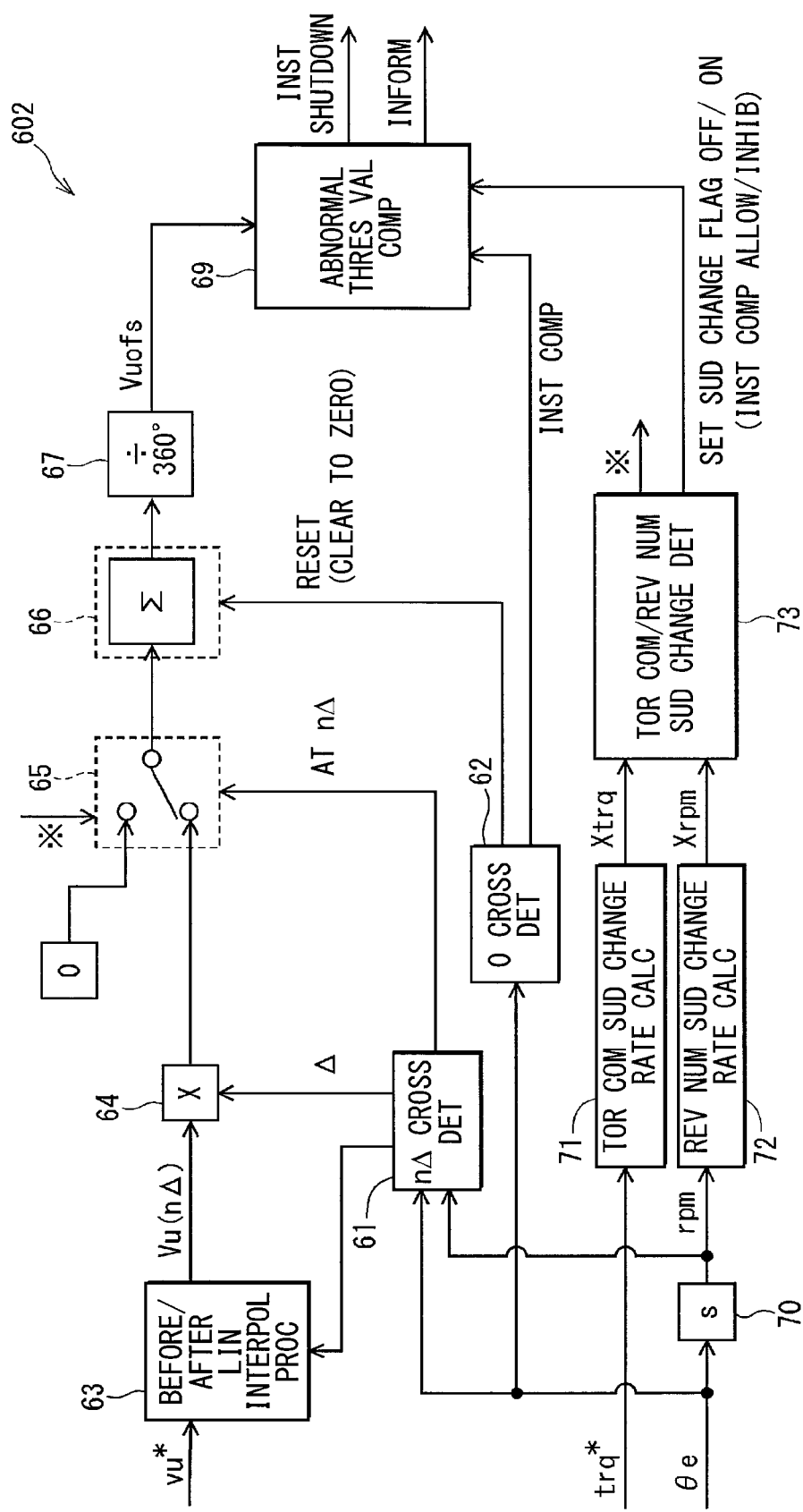
FIG. 14 is a block diagram to show a construction of a plus/minus offset abnormality detection part according to the second embodiment of the present disclosure.

As shown in FIG. 14, the construction of the plus/minus offset abnormality detection part 602 of the second embodiment accumulates and updates the U phase voltage command interpolated value Vu (n$\Delta$) after the before/after interpolation processing 63 as it is. For this reason, the multiplier 64, the switching part 55, the integrator 66, and the divider 67 are constructed in one line for each phase voltage command.

A U phase voltage offset value Vuofs outputted from the divider 67 is inputted to the abnormality threshold value comparison part 69 and is compared with a U phase offset threshold value. However, when the torque/number-of-revolutions sudden change determination part 73 sets on the sudden change flag, the torque/number-of-revolutions sudden change determination part 73 switches the switching part 65 to "0" side and zeros the U phase voltage offset value Vuofs.

When the absolute value of the U phase voltage offset value Vuofs is larger than the U phase offset threshold value, the abnormality threshold value comparison part 69 provides the determination that the current sensor system is abnormal and gives a shutdown instruction.

Figure 15:
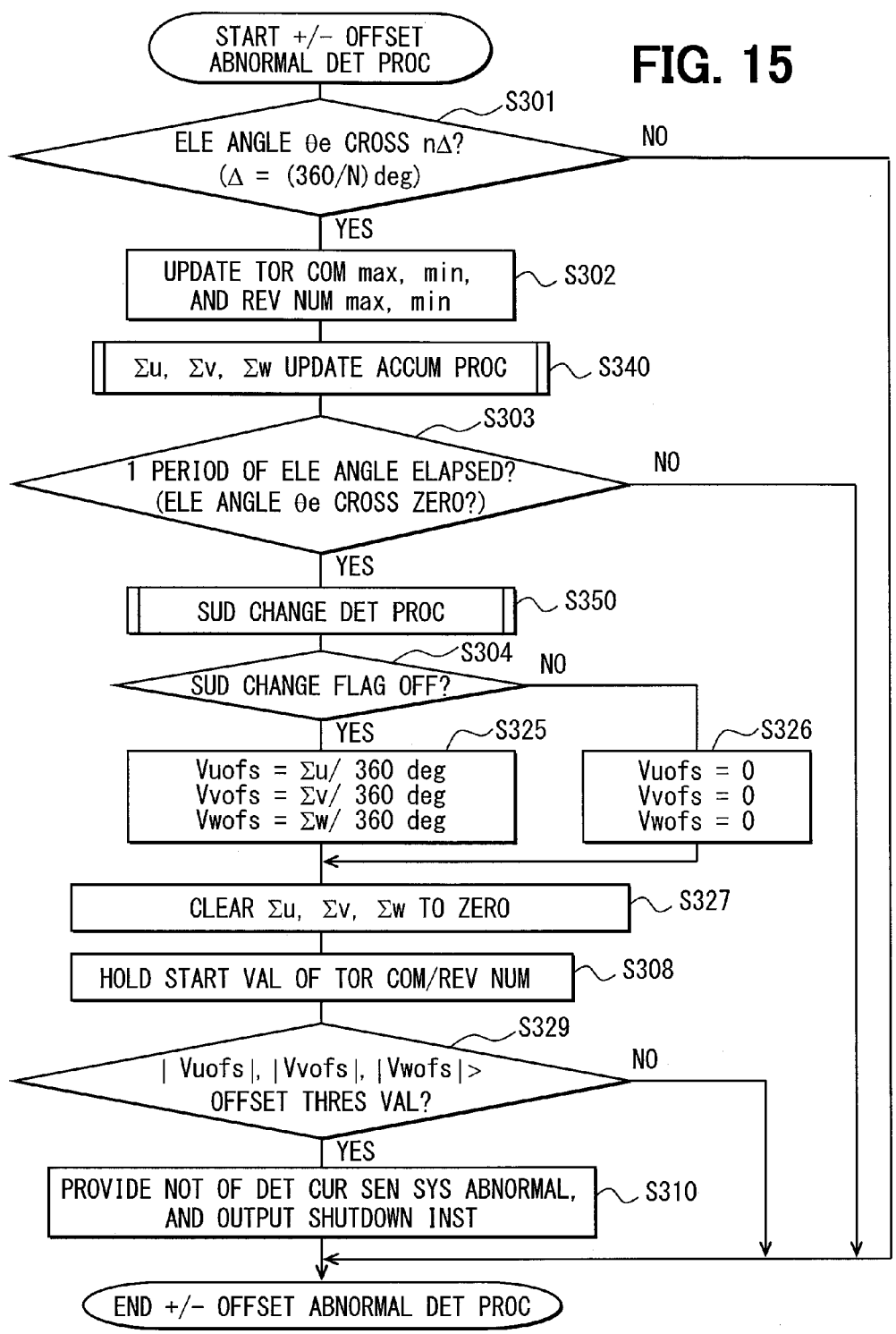
FIG. 15 is a main flow chart of plus/minus offset abnormality detection processing according to the second embodiment of the present disclosure.
Figure 16:
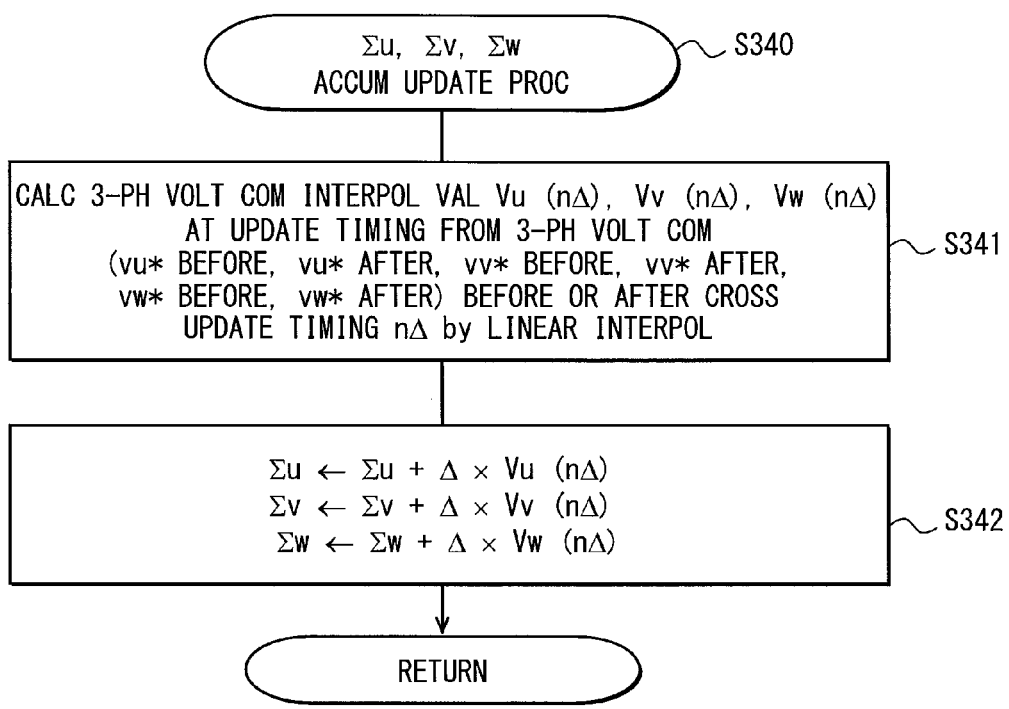
FIG. 16 is a subordinate flow chart of $\Sigma$ u, $\Sigma$ v, $\Sigma$ w accumulation update processing shown in FIG. 15.

Next, the flow chart of the plus/minus offset abnormality detection processing shown in FIG. 15 and FIG. 16 is different from the flow chart (FIG. 9) of the first embodiment in the following points.

(2F1) In place of "the $\Sigma$d cos, $\Sigma$d sin, $\Sigma$q cos, $\Sigma$q sin accumulation update processing" of S330, "$\Sigma$u, $\Sigma$v, $\Sigma$w accumulation update processing" of S340 (subordinate flow chart shown in FIG. 16) is included.

(2F2) In place of "the V$\Delta$d, V$\Delta$q calculation processing" of S360 and "V$\Delta$d=0, V$\Delta$q=0 processing" of S306, "Vuofs, Vvofs, Vwofs calculation processing" of S325 and "Vuofs=0, Vvofs=0, Vwofs=0 processing" of S326 are included.

(2F3) In place of "the $\Sigma$d cos, $\Sigma$d sin, $\Sigma$q cos, $\Sigma$q sin zero-clearing processing" of S307, "a $\Sigma$u, $\Sigma$v, $\Sigma$w zero-clearing processing" of S327 is included.

(2F4) In place of S309 of "the processing of comparing V$\Delta$d, V$\Delta$q with the dq voltage variation threshold values", "processing of comparing the absolute values of Vuofs, Vvofs, Vwofs with the phase voltage offset threshold values of S329 is included.

S340 will be described with reference to FIG. 16.

In S341, as to the respective phases of the U phase, the V phase, and the W phase, the three-phase voltage command interpolated values Vu (n$\Delta$), Vv (n$\Delta$), Vw (n$\Delta$) at the update timing are found from the voltage command values before and after the update point nΔ (vu*-before, vu*-after, vv*-before, vv*-after, vw*-before, vw*-after) by the linear interpolation.

In S342, as to the respective phases of the U phase, the V phase, and the W phase, the product of "electric angle interval Δ" and "three-phase voltage command interpolated values Vu (nΔ), Vv (nΔ), Vw (nΔ) at the update timing" are accumulated to the last value and are updated. That is, the following equations (9. 1) to (9. 3) are calculated.

$$\Sigma u \leftarrow \Sigma u + \Delta \times Vu(n\Delta) \qquad (9.1)$$

$$\Sigma v \leftarrow \Sigma v + \Delta \times Vv(n\Delta) \qquad (9.2)$$

$$\Sigma w \leftarrow \Sigma w + \Delta \times Vw(n\Delta) \qquad (9.3)$$

Returning to FIG. 15, in S325 to which the procedure proceeds in the case where the sudden change flag is OFF (S304: YES), Σ u, Σ v, Σ w accumulated for one period of the electric angle are divided by 360 [deg] as shown by the following equations (10. 1) to (10. 3) to thereby calculate the phase voltage offset values Vuofs, Vvofs, Vwofs.

$$Vuofs = \Sigma u/360 \text{ deg} \qquad (10.1)$$

$$Vvofs = \Sigma v/360 \text{ deg} \qquad (10.2)$$

$$Vwofs = \Sigma w/360 \text{ deg} \qquad (10.3)$$

Here, each of the phase voltage offset values Vuofs, Vvofs, Vwofs can be a plus value or a minus value.

On the other hand, in S326 to which the procedure proceeds in the case where the sudden change flag is ON (S304: NO), Vuofs, Vvofs, Vwofs are zeroed, whereby the plus/minus offset abnormality detection processing is substantially stopped.

In subsequent S327, Σ u, Σ v, Σ w are cleared to zero.

In S329, the absolute values of the phase voltage offset values Vuofs, Vvofs, Vwofs are compared with the phase voltage offset threshold values, and if there is a phase in which the absolute value of the phase voltage offset value is larger than the phase voltage offset threshold value (S329: YES), the abnormality threshold value comparison part 69 provides the determination that the current sensor system is abnormal and instructs shutdown (S310) and the plus/minus offset abnormality detection processing is finished.

Here, with reference to the setting of the dq voltage variation threshold values of the first embodiment, the phase voltage offset threshold values can be set on the basis of the offset amount appearing in the phase voltage commands at the time of inversely dq transforming the voltage amplitudes ΔVdamp, ΔVqamp (equations (8. 7), (8. 8)) when the d-axis, q-axis voltage commands vd*, vq* cause electric primary variations.

On the other hand, if it is determined in S329 that all of the absolute values of the phase voltage offset values Vuofs, Vvofs, Vwofs are not larger than the voltage offset threshold values (S329: NO), it can be thought that all of the current sensors 16, 17, 18 of three phases are normal, so the plus/minus offset abnormality detection processing is finished without performing any more processing.

In the second embodiment, by integrating the three-phase voltage commands vu*, vv*, vw* for one period of the electric angle, it is possible to directly detect the offset errors of the phase current sensed values.

Furthermore, by performing the sudden change determination processing, just like the first embodiment, it is possible to prevent an erroneous determination based on the variations in voltage by a cause other than the errors of the current sensors.

Third Embodiment

An electric motor control device of a third embodiment of the present disclosure will be described mainly with reference to FIG. 17 to FIG. 19. The third embodiment and the next fourth embodiment are characterized in that in place of the sudden change determination processing of the torque command trq* or the number of revolutions rpm, abnormality threshold value correction processing is performed. In particular, in the third embodiment, the dq voltage variation threshold values are corrected in the plus/minus offset abnormality detection processing based on the dq voltage commands.

The construction of the whole of the control section of the third embodiment is the same as FIG. 5 of the first embodiment. Furthermore, the construction of the plus/minus offset abnormality detection part will be described with reference to FIG. 17.

Figure 17:
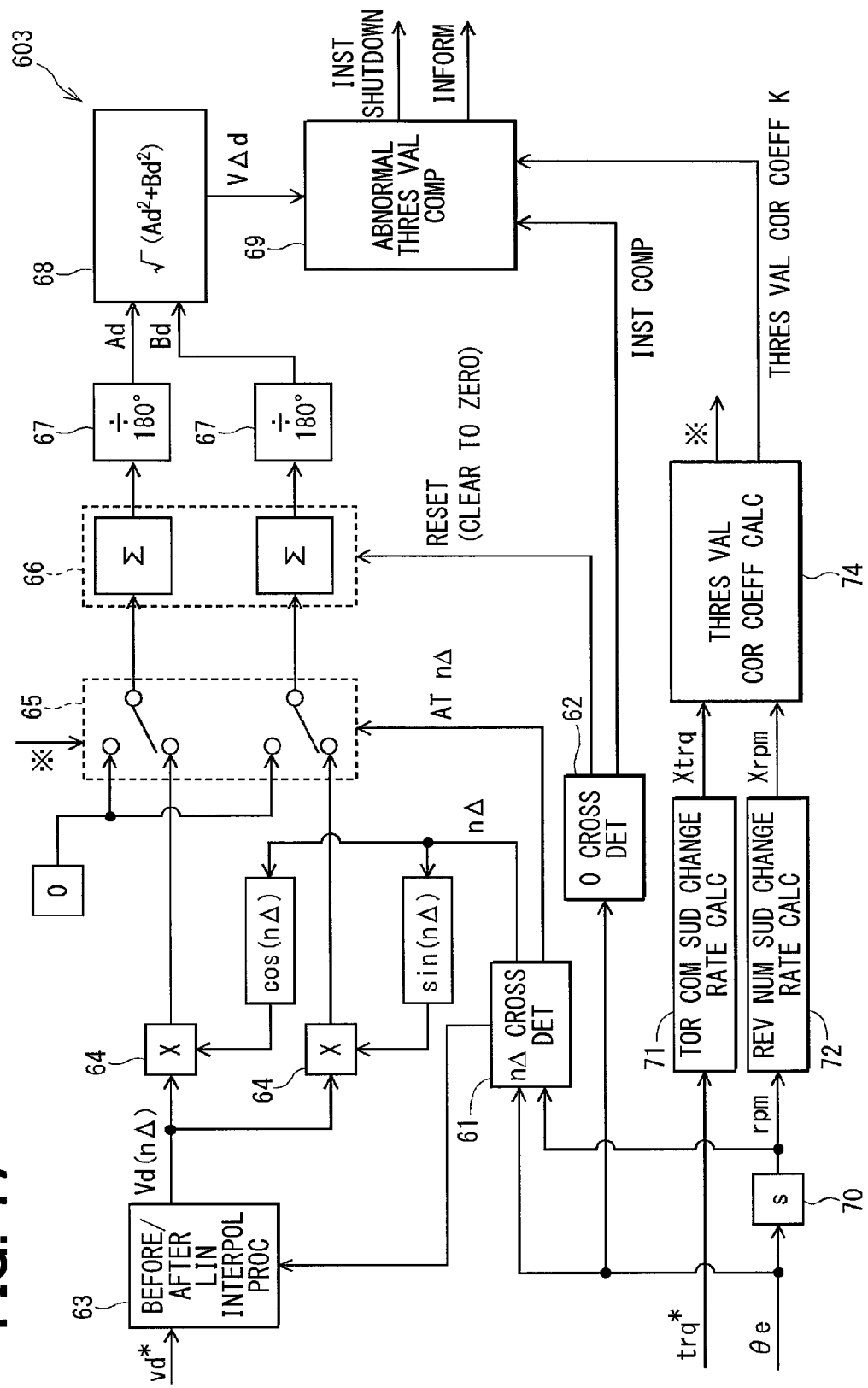
FIG. 17 is a block diagram to show a construction of a plus/minus offset abnormality detection part according to a third embodiment of the present disclosure.

As shown in FIG. 17, when compared with the plus/minus offset abnormality detection part 601 of the first embodiment (FIG. 6), a plus/minus offset abnormality detection part 603 of the third embodiment includes a threshold value correction coefficient calculation part 74 in place of the torque command/number-of-revolutions sudden change determination part 73.

The threshold value correction coefficient calculation part 74 calculates a threshold value correction coefficient K on the basis of the torque command sudden change rate Xtrq, which is calculated by the torque command sudden change rate calculation part 71, and the number-of-revolutions sudden change rate Xrpm, which is calculated by the number-of-revolutions sudden change rate calculation part 72.

A flow chart of the whole of the current feedback control of the third embodiment is approximately the same as FIG. 8 of the first embodiment, but is different in that S117 is moved between S114 and S300. In other words, if it is determined that S104 or S106 is NO, S112 and S114 are performed and then S117 is performed and then "plus/minus offset abnormality detection processing" of S300 is performed. This point is the same for the next fourth embodiment.

Figure 18:
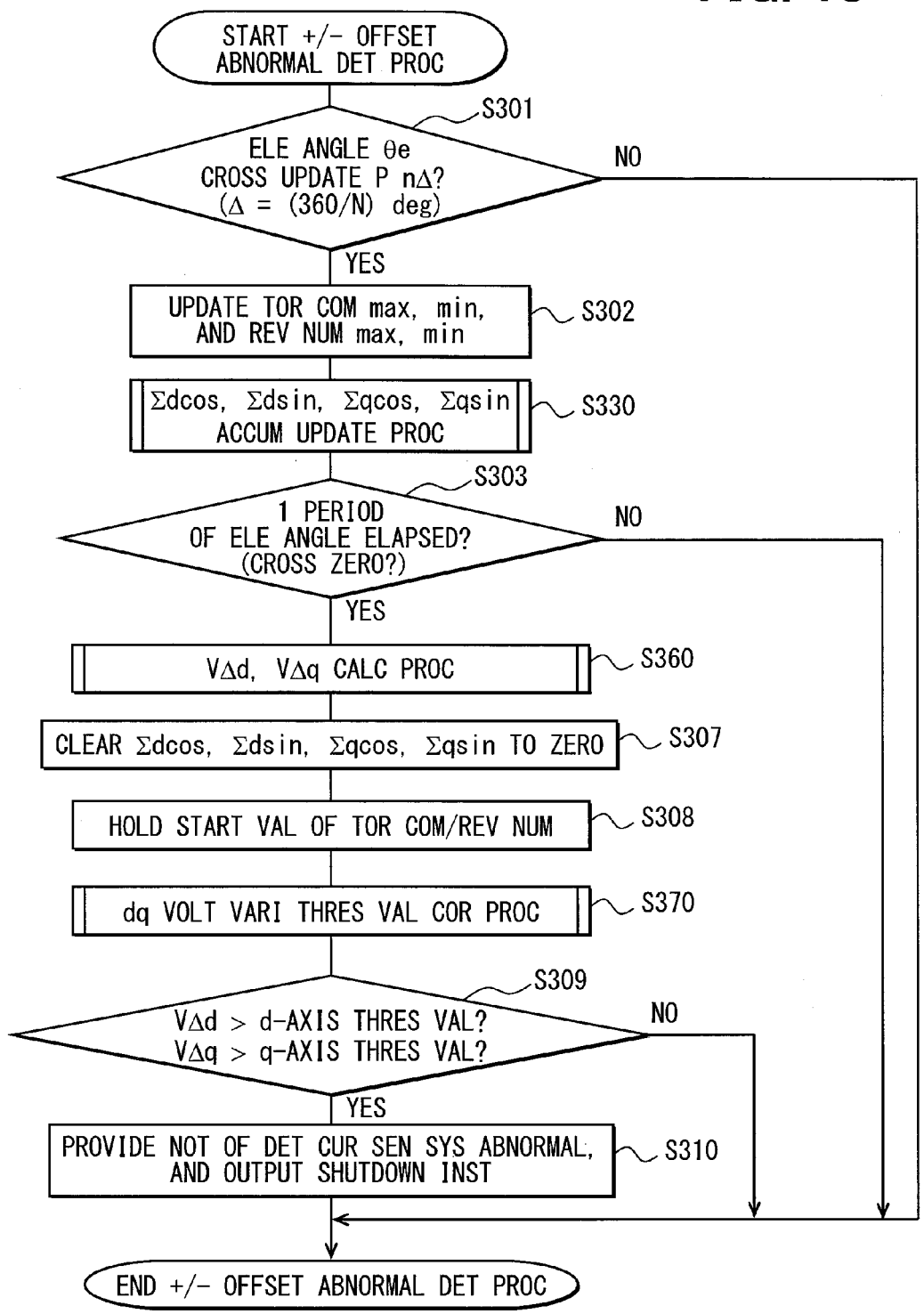
FIG. 18 is a main flow chart of plus/minus offset abnormality detection processing according to the third embodiment of the present disclosure.
Figure 19:
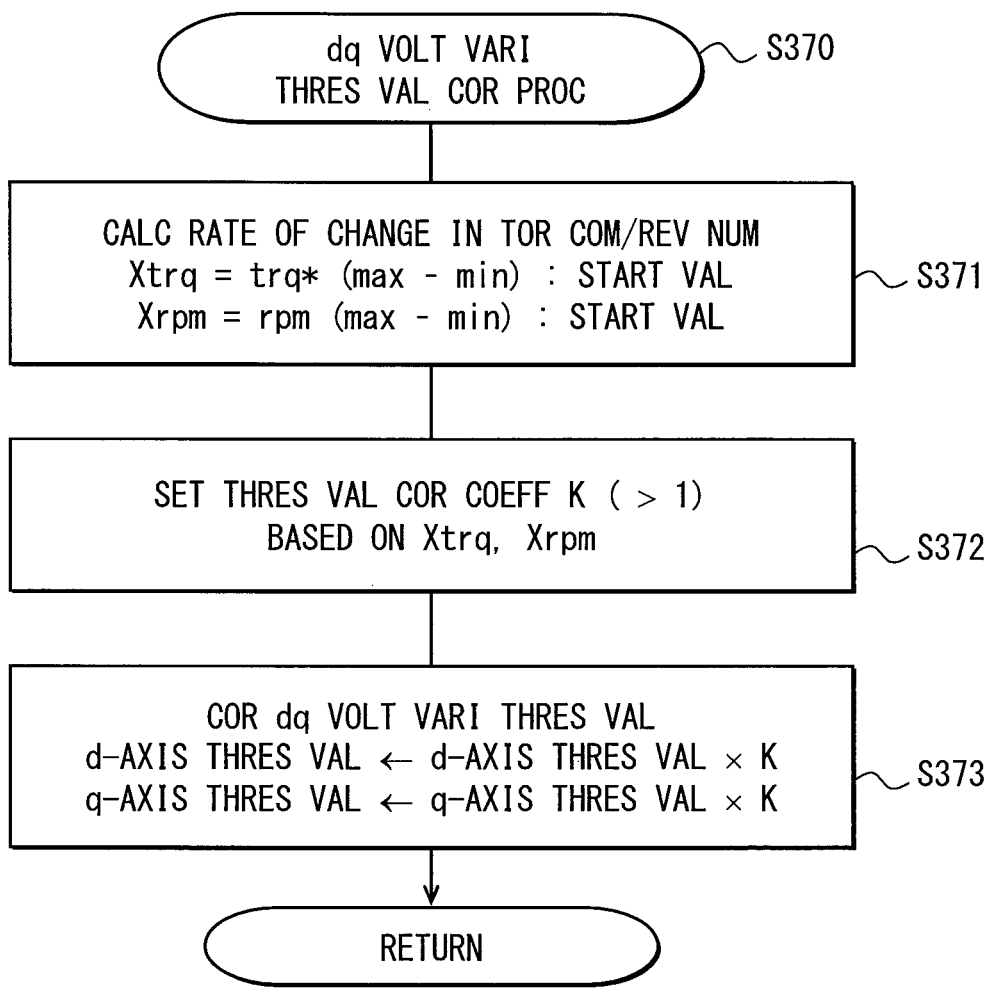
FIG. 19 is a subordinate flow chart of dq voltage variation threshold value correction processing shown in FIG. 18.

The flow chart of the plus/minus offset abnormality detection processing shown in FIG. 18 and FIG. 19 is different in the following points from the flow chart of the first embodiment (FIG. 9).

(3F1) "The sudden change determination processing" of S350, the sudden change flag OFF determination step of S304, and S306 to which the procedure proceeds in the case where S304 is NO are not included.

(3F2) "dq voltage variation threshold value correction processing" of S370 (subordinate flow chart shown in FIG. 19) is included between S308 and S309.

S370 will be described with reference to FIG. 19.

In S371, just like S351 of the sudden change determination processing of the first embodiment (FIG. 11), the torque command sudden change rate Xtrq and the number-of-revolutions sudden change rate Xrpm are calculated by the equations (5. 1), (5. 2). However, "the dq voltage variation threshold value correction processing" is absolutely different in terms of idea from "the sudden change determination processing" and hence is designated by another step number.

In S372, the threshold value correction coefficient calculation part 74 calculates a threshold value correction coefficient K larger than 1 on the basis of the torque command sudden change rate Xtrq and the number-of-revolutions sudden change rate Xrpm and gives the threshold value correction coefficient K to the abnormality threshold value comparison part 69. For example, the threshold value correction coefficient K can be calculated by the use of the following equation (11).

$$K=(1+Xtrq)\times(1+Xrpm) \quad (11)$$

The abnormality threshold value comparison part 69 corrects the respective voltage variation threshold values of the d axis and the q axis on the basis of the threshold value correction coefficient K instructed from the threshold value correction coefficient calculation part 74 in such a way that values obtained by multiplying the previous dq voltage variation threshold values by the threshold value correction coefficient K are made new dq voltage variation threshold values (S373).

In this way, the dq voltage variation threshold values are gradually made larger values, so that when the dq voltage variation values $V\Delta d$, $V\Delta q$ are compared with the dq voltage variation threshold values (S309 shown in FIG. 18), the case where it is determined that dq voltage variation values $V\Delta d$, $V\Delta q$ are abnormal tends to be decreased. Moreover, while the dq voltage variation threshold values are corrected on the basis of the sudden change, the plus/minus offset abnormality detection processing is not completely stopped but a plus/minus offset abnormality detection function can be appropriately held for the dq voltage variations larger than the dq voltage variation threshold values.

Returning to FIG. 18, in S309 following S370, the d-axis voltage variation value $V\Delta d$ is compared with the d-axis voltage variation threshold value, and the q-axis voltage variation value $V\Delta q$ is compared with the q-axis voltage threshold value. If at least one of the d-axis voltage variation value $V\Delta d$ and the q-axis voltage variation value $V\Delta q$ is larger than the d-axis voltage variation threshold value or the q-axis voltage variation threshold value (S309: YES), the abnormality threshold value comparison part 69 provides the determination that the current sensor system is abnormal and gives a shutdown instruction (S310).

In this way, when the torque command or the number of revolutions is suddenly changed, the third embodiment corrects the dq voltage variation threshold values according to the sudden change rate and hence can prevent an erroneous determination based on the variations in voltage by a cause other than the error of the current sensors, just like the sudden change determination processing according to the first embodiment.

Here, from the viewpoint of preventing an erroneous determination without fail, it is preferable that the threshold value correction coefficient K is set at a sufficiently large value having an allowance. The use of the threshold value coefficient K calculated by the use of the equation (11) is effective for setting voltage variation threshold values of "preventing an erroneous determination caused by the sudden change and appropriately holding the plus/minus offset abnormality detection function".

Fourth Embodiment

An electric motor control device of a fourth embodiment of the present disclosure will be described mainly with reference to FIG. 20 to FIG. 22. The fourth embodiment corrects the phase voltage offset threshold values in the plus/minus offset abnormality detection processing based on the three-phase voltage commands.

The construction of the whole of the control section of the fourth embodiment is the same as FIG. 13 of the second embodiment. Further, the construction of the plus/minus offset abnormality detection part will be described with reference to FIG. 20.

Figure 20:
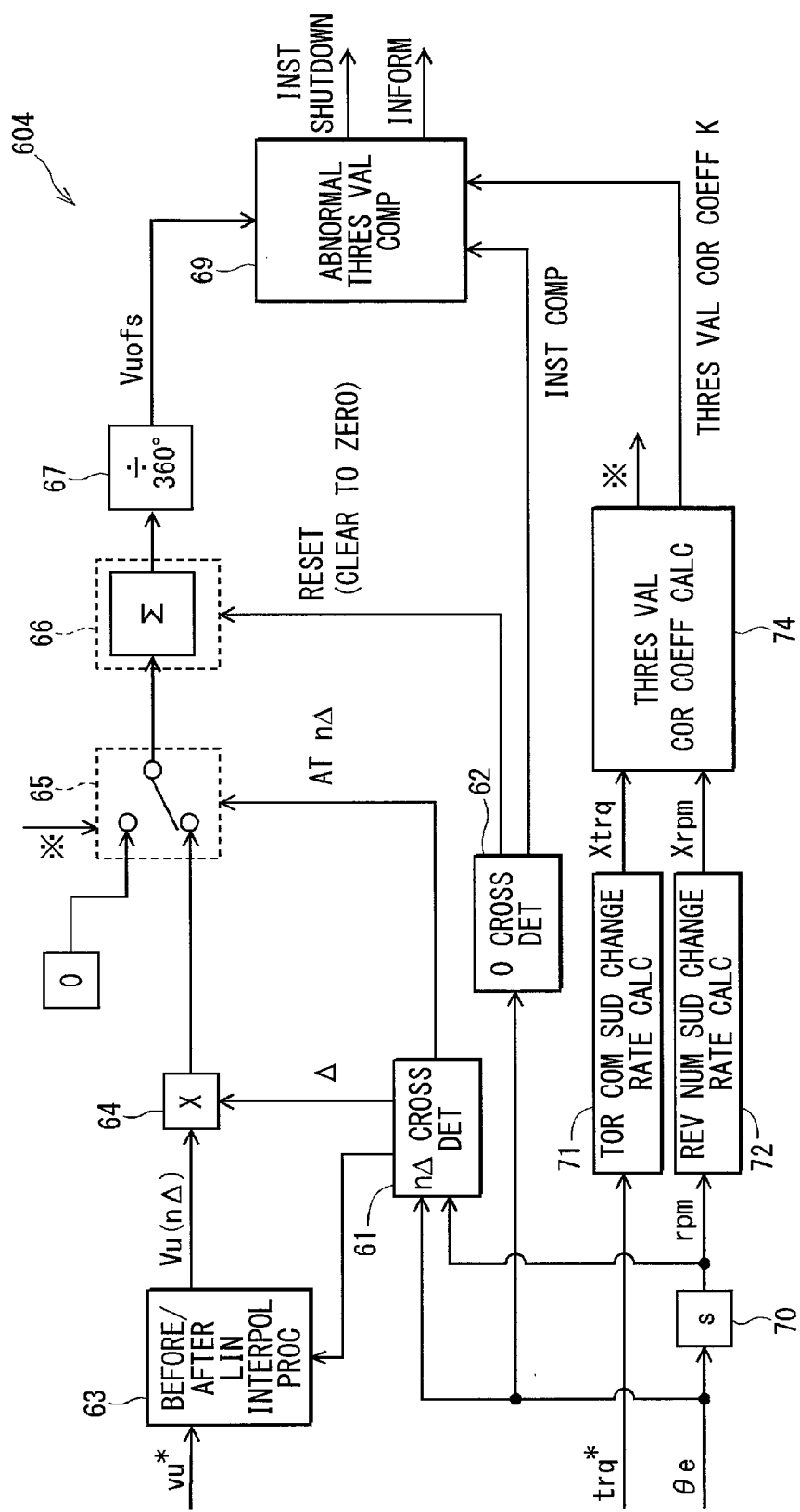
FIG. 20 is a block diagram to show a construction of a plus/minus offset abnormality detection part according to the fourth embodiment of the present disclosure.

As shown in FIG. 20, when compared with the plus/minus offset abnormality detection part 602 of the second embodiment (FIG. 14), a plus/minus offset abnormality detection part 604 of the fourth embodiment includes a threshold value correction coefficient calculation part 74, which is substantially the same as that in the third embodiment, in place of the torque command/number-of-revolutions sudden change determination part 73.

Figure 21:
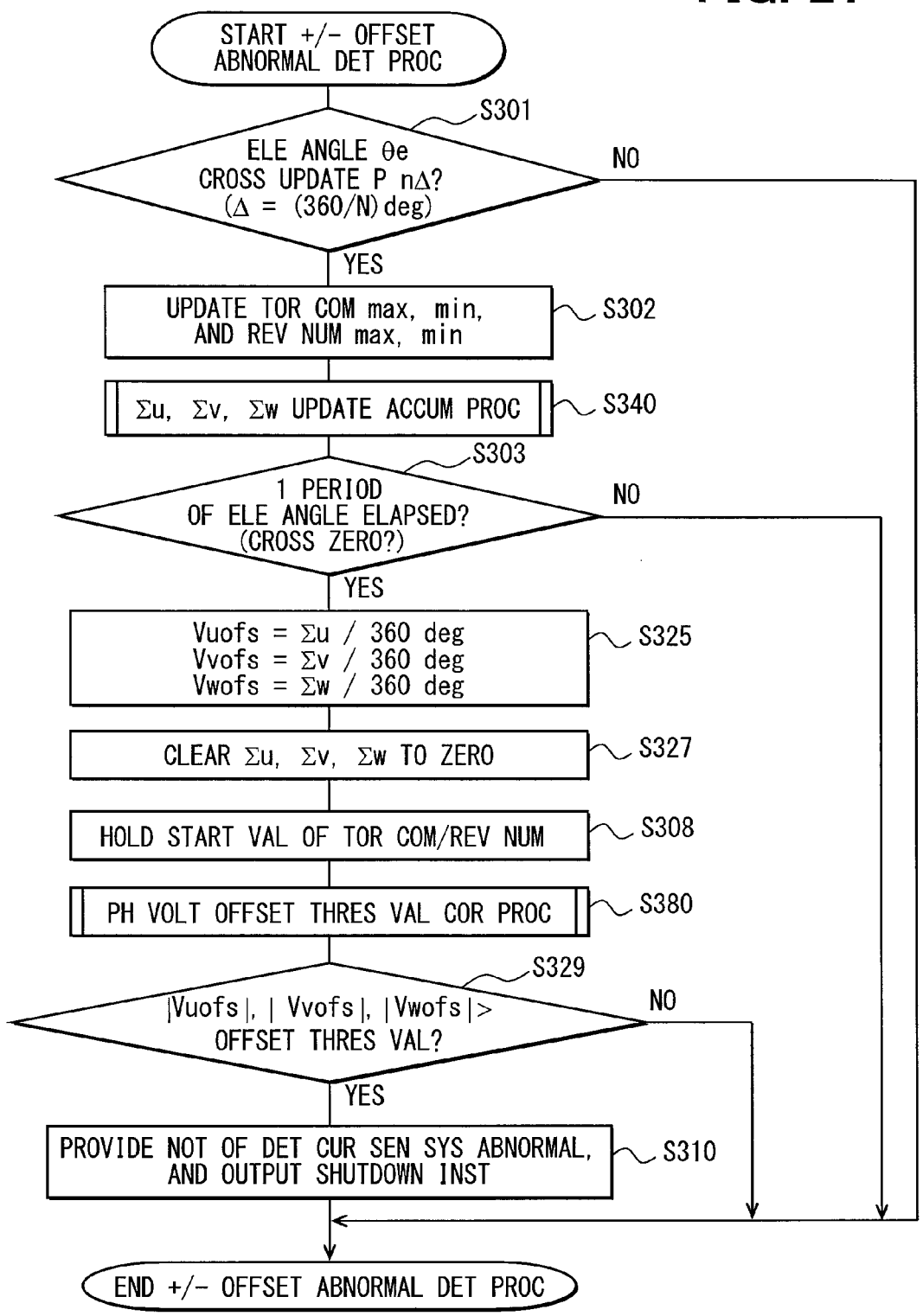
FIG. 21 is a main flow chart of plus/minus offset abnormality detection processing according to the fourth embodiment of the present disclosure.
Figure 22:
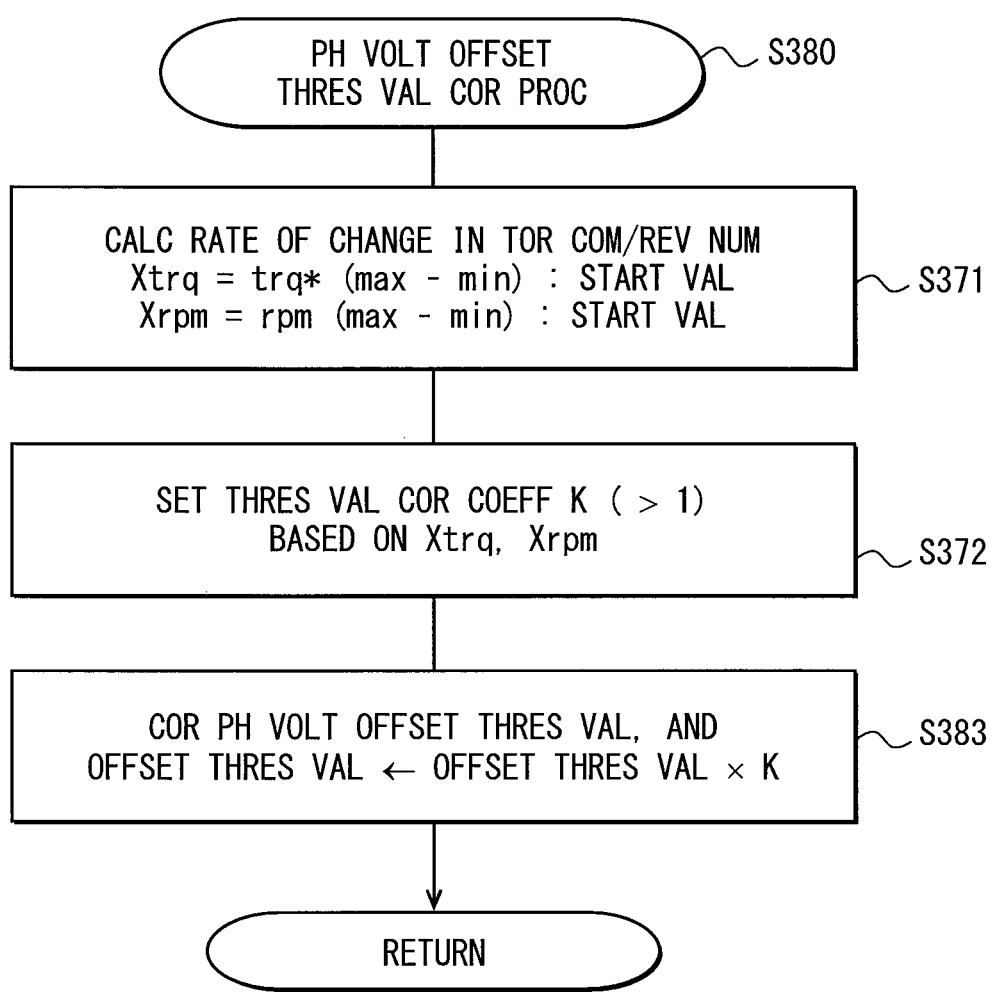
FIG. 22 is a subordinate flow chart of phase voltage offset threshold value correction processing shown in FIG. 21.

The flow chart of the plus/minus offset abnormality detection processing shown in FIG. 21 and FIG. 22 is different in the following points from the flow chart of the second embodiment (FIG. 15).

(4F1) "The sudden change determination processing" of S350, the sudden change flag OFF determination step of S304, and S326 to which the procedure proceeds in the case where S304 is NO are not included. This different point is the same as the different point in which the third embodiment is different from the first embodiment.

(4F2) "Phase voltage offset threshold value correction processing" of S380 (subordinate flow chart shown in FIG. 22) is included between S308 and S329.

S380 will be described with reference to FIG. 22. S380, in general, corresponds to processing in which the dq voltage variation values $V\Delta d$, $V\Delta q$ in S370 (FIG. 19) of the third embodiment are replaced by phase voltage offset values Vuofs, Vvofs, Vwofs. S371 and S372 are the same as those in S370.

The abnormality threshold value comparison part 69 corrects the phase voltage offset threshold values on the basis of the threshold value correction coefficient K instructed from the threshold value correction coefficient calculation part 74 in such a way that values obtained by multiplying the previous phase voltage offset threshold values by the threshold value correction coefficient K are made new phase voltage offset threshold values (S383).

In this way, the phase voltage offset threshold values are gradually made larger values, so that when the phase voltage offset values Vuofs, Vvofs, Vwofs are compared with the phase voltage offset threshold values (S329 shown in FIG. 21), the case where it is determined that the phase voltage offset values Vuofs, Vvofs, Vwofs are abnormal tends to be decreased. Moreover, while the phase voltage offset threshold values are corrected on the basis of the sudden change, the plus/minus offset abnormality detection processing is not completely stopped but a plus/minus offset abnormality detection function can be appropriately held for phase voltage offset values larger than the phase voltage offset threshold values.

Returning to FIG. 21, in S329 following S380, the absolute values of the phase voltage offset values Vuofs, Vvofs, Vwofs are compared with the phase voltage offset threshold values for each phase. If the absolute value of one or more phase voltage offset values is larger than the phase voltage offset threshold value (S329: YES), the abnormality threshold value comparison part 69 provides the determination that the current sensor system is abnormal and gives a shutdown instruction (S310).

In this way, the fourth embodiment produces the same effect as the third embodiment.

Other Embodiments (A) In FIG. 6 and FIG. 14 of the first embodiment and the second embodiment, the torque command sudden change rate Xtrq, which is calculated by the independent torque command sudden change rate calculation part 71, and the number-of-revolutions sudden change rate Xrpm, which is calculated by the independent number-of-revolutions sudden change rate calculation part 72, are inputted to the torque command/number-of-revolutions sudden change determination part 73. The construction of the sudden change determination processing is not limited to this construction but it is also recommended to employ a construction in which: the torque command sudden change rate calculation part 71 and the number-of-revolutions sudden change rate calculation part 72 are not provided; but the torque command/number-of-revolutions sudden change determination part 73 acquires the torque command trq* and the number of revolutions rpm and makes a sudden change determination by itself.

Furthermore, the torque command sudden change rate Xtrq and the number-of-revolutions sudden change rate Xrpm, which are shown by the equations (5. 1) and (5. 2), are used as reference values for determining a sudden change in the torque command and the number of revolutions. However, the reference values are not limited to (5. 1) and (5. 2) but sudden change rates defined by different equations or other reference values expressing the degree of the sudden change may be used (for example, a simple amount of change in a specified time) and a different determination method may be employed.

(B) An equation for calculating the threshold value correction coefficient K larger than 1 on the basis of the torque command sudden change rate Xtrq and the number-of-revolutions sudden change rate Xrpm in the third embodiment and the fourth embodiment is not limited to the equation (11) but may be an equation capable of calculating a sufficiently large threshold value correction coefficient K from the viewpoint of preventing an erroneous determination or may be derived from a map.

(C) The plus/minus offset abnormality detection processing of the embodiments described above integrates the dq voltage variation threshold values or the phase voltage offset threshold values for the interval of one period of the electric angle, and the interval of accumulation (integration) may be m periods (m is a natural number) of the electric angle. As m is larger and the period of integration is longer, the plus/minus offset abnormality detection function is stronger for noises and operation errors but is easily suffered from the effect of the sudden change. Hence, it is preferable that an appropriate detection interval is set so as to strike a balance between them.

(D) The before/after linear interpolation processing in the embodiments described above is premised on a control system in which a control operation period is not synchronous with the electric angle, for example, a control system in which a control operation is performed with a constant period so as to be synchronous with a PWM carrier or the like.

In contrast to this, in the case where the present disclosure is applied to a control system in which a control operation is performed in synchronization with the electric angle and in which a voltage command at an update timing can be directly acquired, the before/after linear interpolation processing is not required.

(E) Voltage commands in the feedback control are not limited to the dq voltage commands or the three-phase voltage commands but voltage commands defined in the other coordinate system may be used.

(F) The control section of the embodiments described above employs "a current feedback control system" in which the current sensed value or the current estimated value is fed back to the current command. The current feedback control system is usually employed in the case where the inverter is driven in a sine wave PWM control mode or an over-modulated PWM control mode.

On the other hand, in the case where the inverter is driven in a square wave control mode in which a current command is not used but in which a phase command is used, "a torque feedback control system" is employed in which a torque estimated value based on a current sensed value is fed back to a torque command. Also to the torque feedback control system can be applied a technical idea of the present disclosure such that "a value integrated for a specified detection interval is compared with a specified abnormality threshold value on the basis of the phase command (in place of the voltage command) to thereby detect a plus/minus offset abnormality". Since the square wave control mode can increase the rate of utilization of voltage more than a sine wave PWM control mode or an over-modulated PWM control mode, the square wave control mode can be effectively used in a region in which high rotation and high torque are required.

(G) In the embodiments described above, the AC motor is the three-phase permanent magnet type synchronous motor, but an induction motor or the other synchronous motor may be employed in the other embodiments. Further, the AC motor of the embodiments described above is the so-called motor generator that has both of the function as an electric motor and the function as a generator, but the AC motor does not need to have the function as the generator in the other embodiments.

(H) The control device of the AC motor according to the present disclosure may be applied not only to a system having only one set of the inverter and the AC motor like the embodiments described above but also to a system having two or more sets of the inverters and the AC motors. Furthermore, the control device of the AC motor according to the present disclosure may be applied to a system of an electric train or the like in which a plurality of AC motors are connected in parallel to one inverter.

(I) The control device of the AC motor according to the present disclosure is not limitedly applied to the AC motor of the hybrid automobile having the construction shown in FIG. 1 but may be applied to an AC motor of an electric vehicle having any construction and may be applied to an AC motor other than the electric vehicle.

The above disclosure has the following aspects.

According to an aspect of the present disclosure, a control device for a three-phase alternate current motor includes: an inverter having a plurality of switching elements for driving the alternate current motor; a plurality of current sensors, each of which senses a current passing through a respective phase of three phases of the alternate current motor; and a control means that has a feedback control operation part for operating a voltage command of each phase so as to converge a deviation between a current sensed value sensed by a respective current sensor and a current command value of a respective phase to be zero and that switches on and off each switching element based on the voltage command of each phase so as to control the current passing through the alternate current motor. When a positive and negative offset abnormality, in which one of the current sensed values of three phases causes a positive offset error and another one of the current sensed values of three phases a negative offset error, occurs, the control means executes a positive and negative offset abnormality detection process for detecting positive and negative offset abnormality in such a manner that the control means compares a value, which is obtained by integrating a variation in a voltage command of each phase over a predetermined detection interval, with a predetermined abnormality threshold value, the voltage command being outputted by the feedback control operation part with respect to a variation in the current passing through a respective phase caused by the positive and negative offset abnormality.

Alternatively, the voltage command may include a d-axis voltage command and a q-axis voltage command, which are directly outputted by the feedback control operation part, or a plurality of three phase voltage commands, which are calculated by inversely d-q transforming the d-axis voltage command and the q-axis voltage command. Further, the voltage command may include the d-axis voltage command and the q-axis voltage command. The value includes a d-axis value and a q-axis value. The d-axis value is obtained by integrating the d-axis voltage command in the Fourier series expand over a M-th period of an electric angle of the alternate current motor, and the q-axis value is obtained by integrating the q-axis voltage command in the Fourier series expand over the M-th period of the electric angle of the alternate current motor. M represents a natural number. The predetermined abnormality threshold value includes a d-axis voltage variation threshold value and a q-axis voltage variation threshold value. In the positive and negative offset abnormality detection process, the control means compares the d-axis value and the q-axis value with the d-axis voltage variation threshold value and the q-axis voltage variation threshold value, respectively. Further, the voltage command value may include the plurality of three-phase voltage commands. The value includes a plurality of three-phase values, which are obtained by integrating the three-phase voltage commands over a M-th period of an electric angle of the alternate current motor, respectively. M represents a natural number. The predetermined abnormality threshold value includes a plurality of phase voltage offset threshold values. In the positive and negative offset abnormality detection process, the control means compares the three-phase values with the phase voltage offset threshold values, respectively.

Alternatively, when a rate of change in a torque command or in a number of revolutions of the alternate current motor in the predetermined detection interval is larger than a predetermined sudden change threshold value, the control means may determine that a sudden change is caused and stops executing the positive and negative offset abnormality detection process.

Alternatively, the control means may correct the predetermined abnormality threshold value by a threshold value correction coefficient, which is determined based on a rate of change in a torque command or in a number of revolutions of the alternate current motor in the predetermined detection interval.

The control means has a feedback control operation part for operating a voltage command in such a way that a deviation between a current sensed value sensed by the current sensor and a current command value converges to zero and switches on/off switching elements of the inverter on the basis of the voltage command.

Furthermore, the control means performs plus/minus offset abnormality detection processing for a plus/minus offset abnormality in which one of the current sensed values of two phases of three phases causes an offset error on a plus side and in which the other of the current sensed values causes an offset error on a minus side. The plus/minus offset abnormality detection processing is performed by comparing a value, which is obtained by integrating a variation in a voltage command over a specified detection interval, with a specified abnormality threshold value, the voltage command value being outputted by the feedback control operation part for a variation in the current caused by the occurrence of an offset abnormality.

Here, "the specified detection interval" corresponds to "an m period of the electric angle (where m is a natural number)".

In this way, it is possible to detect the plus/minus offset abnormality of the current sensors that cannot be detected even by monitoring the sum of the current sensed values of three phases because an offset error on the plus side and an offset error on the minus side cancel each other out. Hence, it is possible to prevent the control of passing current through an AC motor from being continuously performed without being aware of the occurrence of the plus/minus offset abnormality.

For example, in the case of an electric motor mounted in an electric vehicle such as a hybrid automobile, it is possible to prevent a reduction in drivability.

Furthermore, in the case where a plus/minus offset abnormality is detected, it is preferable that, for example, a user is informed of the abnormality and that the drive of the AC motor is stopped from the viewpoint of fail-safe.

"The voltage command outputted by the feedback control operation part" in the plus/minus offset abnormality detection processing is typified specifically by "a d-axis voltage command and a q-axis voltage command (hereinafter referred to as" " dq voltage commands", as required), which are directly outputted by the feedback control operation part", or by "three-phase voltage commands calculated by inversely dq transforming the dq voltage commands".

In the case where the dq voltage commands are used, the abnormality threshold value is set as "a d-axis voltage threshold value and a q-axis voltage threshold value (hereinafter referred to as "dq voltage variation threshold values", as required)". Then, values, which are obtained by integrating the dq voltage commands in the Fourier series expand over an m period (where m is a natural number) of the electric angle, are compared with the dq voltage variation threshold values.

On the other hand, in the case where three-phase voltage commands are used, the abnormality threshold value is set as "phase voltage offset threshold values". Then, values, which are obtained by integrating the three-phase voltage commands over an m period (where m is a natural number) of the electric angle, are compared with the phase voltage offset threshold values.

Regarding "the m period of the electric angle", as m becomes larger and hence an integration interval is made longer, the plus/minus offset abnormality detection processing becomes stronger in noises and operation errors but easily suffers from the effect of a sudden change, which will be described later. Hence, it is preferable that an appropriate detection interval is set so as to strike a balance between them.

Furthermore, in the plus/minus offset abnormality detection processing, it is likely to make an erroneous determination that an error other than an offset error of the current sensed value, for example, a change in a request output torque or a change in the number of revolutions of an AC motor is a plus/minus offset abnormality.

Hence, in order to prevent the erroneous determination like this, when a rate of change in a torque command or in the number of revolutions of the AC motor in a detection interval is larger than a specified sudden change threshold value, it is preferable that the control means determines that a sudden change is caused and stops the plus/minus offset abnormality detection processing. When it is determined that the torque command or the number of revolutions is suddenly changed, it is most safe to stop the plus/minus offset abnormality detection processing in this manner.

Alternatively, it is also recommended to correct the abnormality threshold values by a threshold value correction coefficient determined on the basis of the rate of change in the torque command or the number of revolutions of the AC motor in the detection interval. Specifically, the abnormality threshold values are corrected in such a way that as the rate of change in the torque command or in the number of revolutions is larger, the abnormality threshold values are made larger.

For example, assuming that the rate of change in the torque command is Xtrq and that the rate of change in the number of revolutions is Xrpm, it is preferable that the abnormality threshold values are multiplied by a threshold value correction coefficient K calculated by the following equation, $$K=(1+X\text{trq})\times(1+X\text{rpm})>1$$

Here, "the value obtained by integrating the voltage command over one period of the electric angle" is calculated on the basis of a voltage command interpolated value found from voltage command values by a linear interpolation, the voltage command values being operated before and after the update timing for each "update timing" by the feedback control operation part, the "update timing" being a timing when the electric angle ($\theta e$) crosses an update point ($n\Delta$). Here, "the update point ($n\Delta$)" is defined as n times (where n is an integer from 0 to (N−1)) an electric angle interval ($\Delta$) corresponding to (1/N) times one period of the electric angle (where N is a natural number). In this way, in a control system in which a control operation is performed with a specified period, which is not synchronous with the electric angle, an appropriate value can be acquired as a voltage command at the update timing.

In this regard, in a control system in which a control operation is performed in synchronization with the electric angle, the timing of the voltage command corresponds with the update timing and hence this processing is not required.

The present disclosure can be applied to a control device of an AC motor mounted in an electric vehicle, for example, a hybrid automobile and an electric automobile. In the AC motor mounted in the electric vehicle, when compared with an AC motor in the other technical field, a request for an improvement in control accuracy and reliability will be higher. Hence, when the control device of the AC motor according to the present disclosure is applied to the AC motor mounted in the electric vehicle, an effect will be produced especially in preventing a reduction in drivability and in realizing fail-safe.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for a three-phase alternate current motor, comprising:
   an inverter having a plurality of switching elements for driving the alternate current motor;
   a plurality of current sensors, each of which senses a current passing through a respective phase of three phases of the alternate current motor; and
   a control means that has a feedback control operation part for operating a voltage command of each phase so as to converge a deviation between a current sensed value sensed by a respective current sensor and a current command value of a respective phase to be zero and that switches on and off each switching element based on the voltage command of each phase so as to control the current passing through the alternate current motor,
   wherein, when a positive and negative offset abnormality, in which one of the current sensed values of three phases causes a positive offset error and another one of the current sensed values of three phases a negative offset error, occurs, the control means executes a positive and negative offset abnormality detection process for detecting positive and negative offset abnormality in such a manner that the control means compares a value, which is obtained by integrating a variation in a voltage command of each phase over a predetermined detection interval, with a predetermined abnormality threshold value, the voltage command being outputted by the feedback control operation part with respect to a variation in the current passing through a respective phase caused by the positive and negative offset abnormality.

2. The control device according to claim 1,
   wherein the voltage command includes a d-axis voltage command and a q-axis voltage command, which are directly outputted by the feedback control operation part, or a plurality of three phase voltage commands, which are calculated by inversely d-q transforming the d-axis voltage command and the q-axis voltage command.

3. The control device according to claim 2,
   wherein the voltage command includes the d-axis voltage command and the q-axis voltage command,
   wherein the value includes a d-axis value and a q-axis value,
   wherein the d-axis value is obtained by integrating the d-axis voltage command in the Fourier series expand over a M-th period of an electric angle of the alternate current motor, and the q-axis value is obtained by integrating the q-axis voltage command in the Fourier series expand over the M-th period of the electric angle of the alternate current motor,
   wherein M represents a natural number,
   wherein the predetermined abnormality threshold value includes a d-axis voltage variation threshold value and a q-axis voltage variation threshold value, and
   wherein, in the positive and negative offset abnormality detection process, the control means compares the d-axis value and the q-axis value with the d-axis voltage variation threshold value and the q-axis voltage variation threshold value, respectively.

4. The control device according to claim 2,
   wherein the voltage command value includes the plurality of three-phase voltage commands,
   wherein the value includes a plurality of three-phase values, which are obtained by integrating the three-phase voltage commands over a M-th period of an electric angle of the alternate current motor, respectively,
   wherein M represents a natural number,
   wherein the predetermined abnormality threshold value includes a plurality of phase voltage offset threshold values, and
   wherein, in the positive and negative offset abnormality detection process, the control means compares the three-phase values with the phase voltage offset threshold values, respectively.

5. The control device according to claim 1,
   wherein, when a rate of change in a torque command or in a number of revolutions of the alternate current motor in the predetermined detection interval is larger than a predetermined sudden change threshold value, the control means determines that a sudden change is caused and stops executing the positive and negative offset abnormality detection process.

6. The control device according to claim 1,
wherein the control means corrects the predetermined abnormality threshold value by a threshold value correction coefficient, which is determined based on a rate of change in a torque command or in a number of revolutions of the alternate current motor in the predetermined detection interval.

7. A control device for a three-phase alternate current motor, comprising:
  an inverter having a plurality of switching elements for driving the alternate current motor;
  a plurality of current sensors, each of which senses a current passing through a respective phase of three phases of the alternate current motor; and
  a controller configured to:
    provide a feedback control operation for operating a voltage command of each phase so as to converge a deviation between a current sensed value sensed by a respective current sensor and a current command value of a respective phase to be zero and that switches on and off each switching element based on the voltage command of each phase so as to control the current passing through the alternate current motor; and
    when a positive and negative offset abnormality, in which one of the current sensed values of three phases causes a positive offset error and another one of the current sensed values of three phases a negative offset error, occurs, execute a positive and negative offset abnormality detection process for detecting positive and negative offset abnormality in such a manner that the controller compares a value, which is obtained by integrating a variation in a voltage command of each phase over a predetermined detection interval, with a predetermined abnormality threshold value, the voltage command being outputted by the feedback control operation with respect to a variation in the current passing through a respective phase caused by the positive and negative offset abnormality.

8. The control device according to claim 7,
wherein the voltage command includes a d-axis voltage command and a q-axis voltage command, which are directly outputted by the feedback control operation, or a plurality of three phase voltage commands, which are calculated by inversely d-q transforming the d-axis voltage command and the q-axis voltage command.

9. The control device according to claim 7,
wherein when a rate of change in a torque command or in a number of revolutions of the alternate current motor in the predetermined detection interval is larger than a predetermined sudden change threshold value, the controller is configured to determine that a sudden change is caused and stops executing the positive and negative offset abnormality detection process.

10. The control device according to claim 7,
wherein the controller is further configured to correct the predetermined abnormality threshold value by a threshold value correction coefficient, which is determined based on a rate of change in a torque command or in a number of revolutions of the alternate current motor in the predetermined detection interval.

* * * * *